(12) United States Patent
Nakamura

(10) Patent No.: US 7,496,411 B2
(45) Date of Patent: Feb. 24, 2009

(54) FUNCTIONAL OBJECT DATA, FUNCTIONAL OBJECT IMAGING SYSTEM, AND OBJECT DATA TRANSMITTING UNIT, OBJECT DATA RECEIVING UNIT AND MANAGING UNIT FOR USE IN THE FUNCTIONAL OBJECT IMAGING SYSTEM

(75) Inventor: Masahiro Nakamura, Tottori (JP)

(73) Assignee: Lexer Research Inc. (JP)

( * ) Notice: Subject to any disclaimer, the term of this patent is extended or adjusted under 35 U.S.C. 154(b) by 1210 days.

(21) Appl. No.: 10/629,601

(22) Filed: Jul. 30, 2003

(65) Prior Publication Data

US 2004/0093103 A1 May 13, 2004

(30) Foreign Application Priority Data

Aug. 5, 2002 (JP) ............................. P2002-226876
Oct. 31, 2002 (JP) ............................. P2002-319164

(51) Int. Cl.
G06F 17/00 (2006.01)
G05B 11/01 (2006.01)
G06T 1/00 (2006.01)
G06T 15/00 (2006.01)

(52) U.S. Cl. ........................... 700/11; 345/418; 345/419
(58) Field of Classification Search .................. 700/11; 345/418, 419
See application file for complete search history.

(56) References Cited

U.S. PATENT DOCUMENTS 5,267,154 A * 11/1993 Takeuchi et al. ............. 345/473
5,434,966 A * 7/1995 Nakazawa et al. .......... 345/617

(Continued)

FOREIGN PATENT DOCUMENTS

JP 11250283 9/1999

(Continued)

OTHER PUBLICATIONS

Japanese Application 2002-319164, Office Action, dated Jun. 12, 2007.

(Continued)

*Primary Examiner*—Albert DeCady
*Assistant Examiner*—Sunray R Chang
(74) *Attorney, Agent, or Firm*—Banner & Witcoff, Ltd.

(57) ABSTRACT

A functional object imaging system using functional object data is provided. The functional object data includes: at least imaging data for imaging functional resources as functional objects in a virtual space and name identifiers allocated to the respective functional objects, and optionally, function control data for provoking or creating a function of a functional object as a subject of control and a second name identifier allocated to the object as the subject of control, the functional object data having a structure to allow a computer to judge whether a relation between a name identifier allocated to a functional object having a predetermined relation to one functional object and a second name identifier allocated to the one functional object satisfies a predetermined condition, interpret function control data on the one functional object when the relation is judged to satisfy the predetermined condition, and control either directly or indirectly imaging data on the functional object having the predetermined relation to the one functional object based on the interpretation thus made to achieve function control over the functional object having the predetermined relation to the one functional object.

14 Claims, 22 Drawing Sheets

U.S. PATENT DOCUMENTS

| | | | |
|---|---|---|---|
| 5,485,560 A | * | 1/1996 | Ishida et al. ................. 345/619 |
| 5,760,759 A | * | 6/1998 | Tanaka et al. ................. 345/95 |
| 5,884,309 A | * | 3/1999 | Vanechanos, Jr. ............ 707/10 |
| 6,222,560 B1 | * | 4/2001 | Naka et al. .................. 345/474 |
| 6,337,700 B1 | * | 1/2002 | Kinoe et al. ................. 715/854 |
| 6,965,803 B2 | * | 11/2005 | Bungert et al. ................ 700/83 |

FOREIGN PATENT DOCUMENTS

| JP | 2000099767 | 4/2000 |
|---|---|---|
| JP | 2000107990 | 4/2000 |
| JP | 2001-195438 | 7/2001 |
| JP | 2001195438 | 7/2001 |
| JP | 2001282331 | 10/2001 |
| JP | 2002157515 | 5/2002 |

OTHER PUBLICATIONS

Nakamura, "Designing Manufacturing Revolution With Picture Technology", Eizojoho Industrial, Japan, Industrial Development Organization Co., Ltd., vol. 32 (11), pp. 73-78, dated Jun. 1, 2000. This cited document discloses a system in which a plurality of part objects are displayed in a virtual space and virtual assembly of these part objects can be realized in the virtual space. However, the cited document does not explain how display of a part object is changed when the part object is joined to the other part object.

* cited by examiner

Fig. 5

SPECIFICATION DATA

| SPECIFICATION DATA IDENTIFIER | SHAPE DATA | MATERIAL DATA | COATING DATA | NUMBER OF PRODUCTS /MONTH |
|---|---|---|---|---|
| a12 | xx2.yyy | sus301 | ○×□ | 15 |
| a15 | xx5.yyy | sus301 | ×△△ | 220 |

OBJECT DATA STRUCTURE

FUNCTION CONTROL DATA STRUCTURE

BLADE CONTROL DATA

CONDITION = "CLICKING THE MOUSE"
ADD BEHAVIOR BLADE
BLADE = "DRILLING"
TO "MACHINING OF MOLD"

FUNCTIONAL OBJECT DATA, FUNCTIONAL OBJECT IMAGING SYSTEM, AND OBJECT DATA TRANSMITTING UNIT, OBJECT DATA RECEIVING UNIT AND MANAGING UNIT FOR USE IN THE FUNCTIONAL OBJECT IMAGING SYSTEM

CROSS REFERENCE TO RELATED APPLICATIONS

This application is based upon and claims the benefit of priority from the prior Japan Patent Application Nos. P2002-226876, filed Aug. 5, 2002, and P2002-319164, filed Oct. 31, 2002, the entire contents of which are incorporated herein by reference.

BACKGROUND OF THE INVENTION

1. Field of the Invention

The present invention relates to a functional object imaging system and the like for use in a system adapted to satisfy the specifications of a required article, service or the like by employing a plurality of functional resources exhibiting their respective functions. The functional object imaging system is configured to evaluate a production plan or its operation based on a combination of such functional resources in a virtual space advantageously.

2. Description of the Related Art

It has been a conventional practice to present a normal data list of functional resources that exhibit various functions when combined together or show an example of operation of such a combination by means of a video display or the like (refer to, for example, patent literature 1: Japanese Patent Laid-Open Gazette No. 2001-195438, p. 3-7 and FIG. 1) for the purpose of explanation of various actions and effects resulting from combinations of such functional resources.

It is, however, very difficult for customers to clearly and intuitively grasp various functions and effects of such combinations of functional resources even if a normal data list of each functional resource as described above and the like are presented. This is because the effect of introduction of a functional resource that exercises various functions based on a given program to yield products, such as a machining center, differs depending on programs used and needs to be evaluated from various aspects such as the specifications of a product to produce, existing equipment of the factory, and the like.

With increasingly complicated and diversified requests of demanders for goods and services in these years, products having various options to realize diversified functions are increasing. The diversity of functions of a product, contradictorily, makes it more difficult for the demanders to grasp the characteristic functions of that product.

That is, since actions and effects of functional resources of this type vary depending on combinations of such resources, environments and the like, it is difficult to predict the function of a combination of functional resources based simply on the function of each resource.

If functions of combinations of functional resources are to be simulated on a computer, a simulation program needs to be developed for each combination, which requires enormous time and labor and hence lacks rapid responsiveness.

In view of the foregoing, the present invention intends to provide a system for imaging a plurality of functional resources as functional objects in a virtual space, the actions and effects of the functional resources being variable depending on combinations of the functional resources, wherein: the functional objects are classified by giving them names which can specify the functional objects on a class or individual basis; and one functional object to be combined is incorporated with at least imaging data for imaging in the virtual space and the names of counterpart functional objects that are combinable with the one functional object, and optionally with name-based function control data which will work on a counterpart functional object when the one functional object and the counterpart object are combined.

If only such functional objects are independently defined in this system, a mere subsequent combination of plural functional objects in the virtual space causes the combination to act dynamically. Thus, the system is capable of presenting the function of a combination of functional resources in the virtual space rapidly and dynamically and hence allows the user to grasp the function clearly, whereas the prior art has required enormous time and labor before allowing the user to grasp such a function.

SUMMARY OF THE INVENTION

In accordance with one aspect of the present invention, there is provided functional object data comprising at least imaging data for imaging functional resources as functional objects in a virtual space and name identifiers allocated to the respective functional objects, and optionally, function control data for provoking or creating a function of a functional object as a subject of control and a second name identifier allocated to the object as the subject of control, the functional object data having a structured to allow a computer to judge whether a relation between a name identifier allocated to a functional object having a predetermined relation to one functional object and a second name identifier allocated to the one functional object satisfies a predetermined condition, interpret function control data on the one functional object when the relation is judged to satisfy the predetermined condition, and control either directly or indirectly imaging data on the functional object having the predetermined relation to the one functional object based on the interpretation thus made to achieve function control over the functional object having the predetermined relation to the one functional object.

Here, the "functional object as a subject of control" may be the one functional object or the counterpart functional object. In the former case the relation between the name identifier and the second name identifier is not judged. The "function", as used herein, is meant to be broader than its generally accepted concept and to include those functions which can be imaged as changes in form (including shape, color, pattern and combinations thereof) that cannot occur in the real world and those functions which do not involve any outward change. The expression "indirectly control imaging data on the aforesaid another functional object having the predetermined relation to the one functional object" is meant to work on function control data on the aforesaid another functional object thereby to control the imaging data on the aforesaid another functional object.

With such functional object data, when one functional object is incorporated into another functional object having a predetermined name identifier, it is only required to define at the aforesaid one functional object function control data that will work on the aforesaid another functional object before combining plural functional objects having predetermined relation to each other in the virtual space. Once the plural functional objects are combined together, an object control section interprets the function control data of interest automatically and dynamically and causes the combination of the functional objects to exhibit functions characteristic of the combination.

Thus, even when evaluation needs to be made of selection or operation of a method of combining a number of functional resources or a layout prior to the introduction of equipment comprising plural functional resources into a factory for example, such evaluation can be made in the virtual space rapidly and easily without requiring enormous time and labor to develop simulation programs for respective combinations of functions resources as required by the prior art.

For a single functional object item to exhibit various functions, preferably the name identifier of the functional object data comprises a plurality of parallel name identifiers each comprising a plurality of element name identifiers forming a hierarchical structure.

The effect of the present invention can be rendered more striking if the aforesaid predetermined relation is expressed by spatial relation data indicative of a spatial relation between the functional objects, structural relation data indicative of a coupling relation between the functional objects, attributive relation data indicative of a relation between roles to be played by the respective functional objects to produce an expected phenomenon, or a combination thereof, while the computer is capable of retrieving and extracting functional objects based on the spatial relation data, structural relation data, attributive relation data, or a combination thereof.

For easy development and for complete automation of dynamic generation of function control data in accordance with specifications, the function control data is desirably structured to be capable of being added, deleted or modified independently of the imaging data. Particularly desirably, the function control data is of a structure comprising a plurality of unit control data items capable of being added, deleted or modified independently of the imaging data.

In a preferred embodiment for development, the function control data has a hierarchical structure in which a higher-level unit control data item belonging to a higher-level hierarchy is related to at least one lower-level unit control data item belonging to a lower-level hierarchy. Particularly preferably, the function control data is of text form.

If the functional object data further comprises utilization data indicative of a status of utilization of the functional objects in the virtual space, it is possible to make utilization charge in accordance with the status of utilization. The expression "to make utilization charge in accordance with the status of utilization", as used herein, is defined to include both of charging for utilization in the virtual space such as imaging according to the imaging data in the virtual space, or provoking or forming the function of the functional object as a subject of control and charging for utilization outside the virtual space such as receiving the functional object data through a predetermined communication channel in accordance with the number of objects or the amount of data.

If the functional object data further comprises indicator data for quantitatively or qualitatively evaluating utilization of the functional objects in the virtual space, it is possible to apply the functional object data to, for example, marketing advantageously.

In order for the functional objects to be coupled to each other suitably in the virtual space, it is preferred that: the functional objects each have a joint described by data capable of indicating a relative or absolute position of the joint in the virtual space; and the computer is configured to be capable of coupling plural functional objects together in the virtual space by coupling the joints of the respective functional objects together.

In accordance with another aspect of the present invention, there is provided an object data receiving unit comprising: an object data receiving section for receiving functional object data; and an object control section operative to retrieve and extract a functional object having a predetermined relation to one functional object imaged in a virtual space based on the object data received, and then interpret function control data on the one functional object and control either directly or indirectly imaging data on the functional object thus extracted based on the interpretation thus made to achieve function control over the extracted functional object in the virtual space when a name identifier of the extracted functional object has a predetermined relation to a second name identifier of the one functional object.

For extracting the behavior of the user and evaluating the characteristics thereof, it is desirable that the object data receiving unit further comprise a recording section for recording a history of operation having been performed on the unit to image functional resources as functional objects in the virtual space and a phenomenon having occurred in the virtual space.

In order for such user's behavior to be utilized in marketing to find required functions, interest-arousing options and function-extracting indicators for example or for a managing provider to watch such user's behavior for marketing, the object data receiving unit desirably further comprises a recorded data transmitting section for externally transmitting the data recorded by the recording section. Preferably, the object data receiving unit further comprises an indicator data calculating section for calculating a indicator allowing the user to operate the unit efficiently based on a history of operation having been performed on the unit to image functional resources as functional objects in the virtual space and a phenomenon having occurred in the virtual space. In order to optimize a production line layout in a factory, personnel of an office and an office equipment layout, the indicator data calculating section may be configured to calculate the indicator for evaluating the efficiency of a constructed system based on a history of phenomenon as autonomous cooperation of a combination of an autonomously operating robot or conveyor having control data, personnel and office equipment, which are disposed or positioned as functional objects. If the indicator is calculated based on data on utilization of the object data receiving unit including utilization frequencies within a fixed period and a total utilization time, the effect of the unit can be rendered outstanding.

The "indicator data", as used herein, is meant to serve as marks which lead the user to smooth understanding of the functions of a whole system and the characteristics of a product, or which help the user judge a function required of a product, an option or a function in which the market can be interested, or the efficiency of operation according to a whole system design. With the indicator data which allows evaluation of usability, user's behavior and system efficiency to be made, a person or the unit becomes capable of quantitatively and qualitatively evaluating a whole system or a product advantageously.

A specific embodiment of the object data receiving unit, which is configured to allow the functional objects to be coupled to each other in the virtual space advantageously, further comprises an automatic editor section for coupling a plurality of functional objects in the virtual space together by means of respective joints thereof when the plurality of functional objects have a predetermined relation therebetween.

On the other hand, a specific embodiment of an object data transmitting unit connected to the object data receiving unit for communication, comprises: a specification data receiving section for receiving specification data comprising data on specifications of a required article, service or analog; an object data forming section for forming object data on all or part of plural functional objects based on the specification data, the plural functional objects being capable of exhibiting a function satisfying the specifications in a virtual space when combined together; and an object data transmitting section for transmitting the object data formed by the object data forming section.

If the object data transmitting unit further comprises a unit control data storage section for storing unit control data items capable of being added, deleted and modified independently of imaging data, plural ones of which form function control data, wherein the object data forming section is operative to fetch plural ones of the unit control data items from the unit control data storage section based on the specification data and combine the unit control data items together to form the function control data, the imaging data and the function control data are independent of each other, which makes development thereof easy, while the function control data is realized comprising a combination of quantized unit control data items, which makes it possible to completely automate dynamic formation of the function control data in accordance with the specification data. The term "combination", as used herein, is a concept including a combination of plural unit control data items regardless of their sequences and a combination of plural control data items in a fixed sequence.

Preferably, each of the unit control data items includes a name identifier of an applicable functional object, while the object data forming section is operative to fetch a unit control data item including a name identifier matching a name identifier of a functional object as a subject of control. With such a feature, even if different developers or corporations have developed their respective original functional objects, merely combining such functional objects displayed in the virtual space allows functions characteristic of the combination to be exhibited easily and dynamically. Thus, the present invention provides the effect of enabling new product development to be realized rapidly while making it possible to quickly and clearly find a product or service satisfying the specifications thereof that recently become increasingly complicated and diversified according to requests from customers. Consequently, the present invention provides a novel possible way of advertising and marketing.

In a specific embodiment of the object data transmitting unit, which renders the effect of the invention striking, the functional object represents production equipment for producing a predetermined article to be produced or sold, or it represents the predetermined article to be produced or sold. Alternatively, the functional object may represent personnel including part-time workers and employees stationed in a layout space such as a factory, office or house, or an article including industrial machines, office equipment and furniture disposed in the layout space.

If a managing unit is provided comprising a recorded data receiving section for receiving data on utilization of functional objects at the object data receiving unit, it is possible to realize, for example, a more effective marketing activity by analyzing the data on utilization of functional objects received.

According to yet another aspect of the present invention, there is provided a functional object imaging system comprising an object data receiving unit and an object data transmitting unit, at least one of which is provided with a charging management section for conducting processing related to charging for utilization of functional objects. The functional object imaging system thus configured is capable of making charge for utilization of the functional objects in the system.

The foregoing and other objects, features and attendant advantages of the present invention will become more apparent from the reading of the following detailed description of the invention in conjunction with the accompanying drawings.

BRIEF DESCRIPTION OF THE DRAWINGS

FIG. 5 is an illustration of specification data according to the same embodiment;

DETAILED DESCRIPTION OF THE PREFERRED EMBODIMENTS

The present invention will now be described in detail with reference to the drawings.

Figure 1:
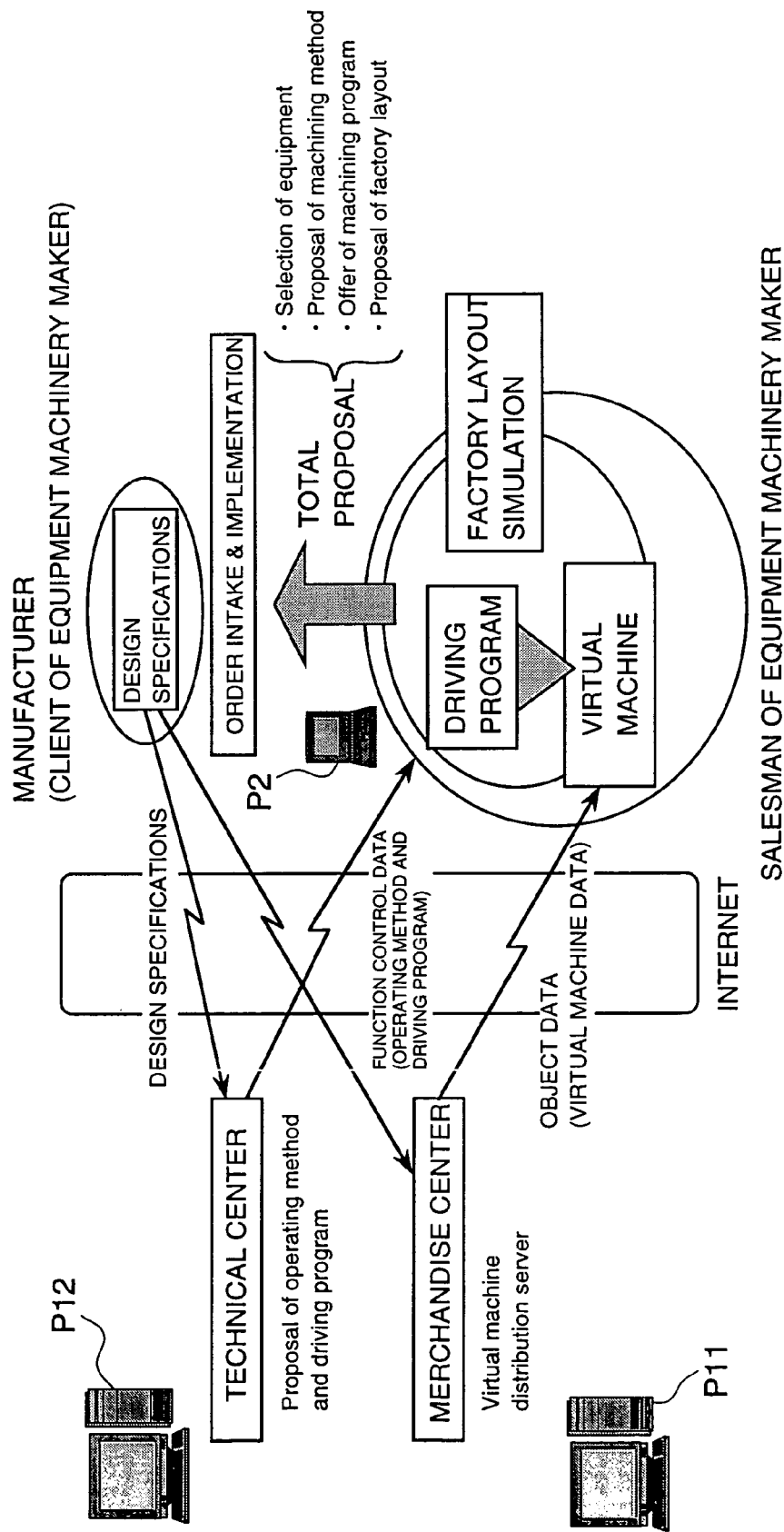
FIG. 1 is a diagram illustrating a whole system configuration according to one embodiment of the present invention.

Referring first to FIG. 1, there is shown a system configuration of a functional object imaging system according to one embodiment of the present invention. In FIG. 1, reference character P11 denotes an object data transmitting unit for transmitting object data, for example, on a machining center (hereinafter referred to as "MC") as one functional resource, while reference character P12 denotes an object data transmitting unit for transmitting object data on a recording medium (for example FDD) storing a MC control program as another functional resource that is incorporated in MC to cause MC to exhibit a predetermined function. These object data transmitting units P11 and P12 may be operated either by a same operator or by different operators. It is needless to say that the units P11 and P12 may be physically integral with each other. Reference character P2 denotes an object data receiving unit to be used, for example, by a salesman for giving explanation of MC to customers. Reference character P3 denotes a managing unit capable of managing data, for example, on utilization of functional objects utilized at the object data transmitting unit P11 or the object data receiving unit P2. These units P11, P12, P2 and P3 are connected to each other for duplex transmission via a communication network such as Internet.

Figure 2:
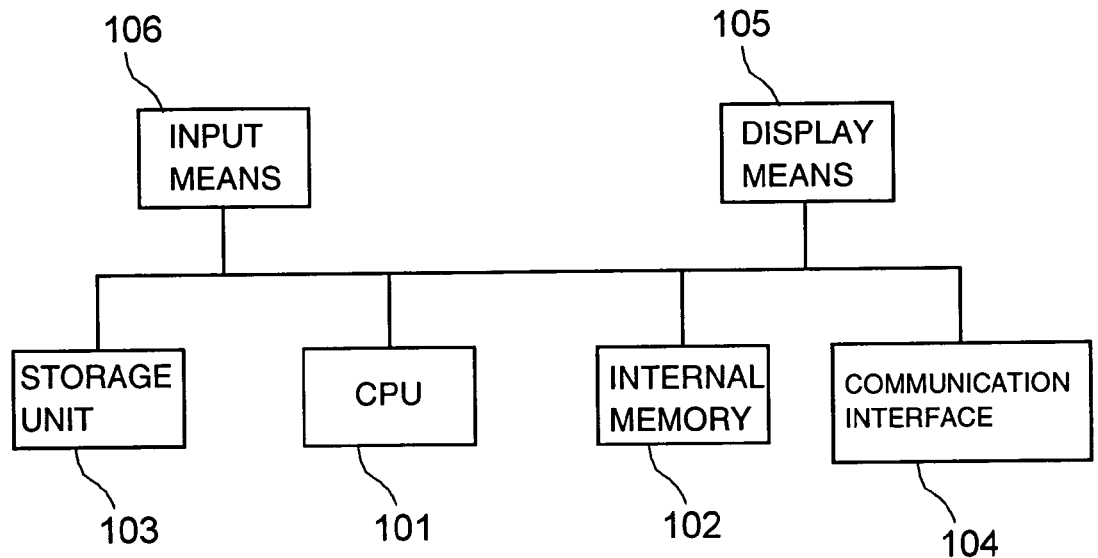
FIG. 2 is a block diagram of the internal unit configuration of an object data transmitting unit according to the same embodiment.

Each of the object data transmitting units P11 and P12 is, for example, a general-purpose computer with a server function, comprising a CPU 101, internal memory 102, external storage unit 103 such as HDD, communication interface 104 such as a modem for connection with a communication network, display 105, input means 106 including a mouse or a keyboard, and the like, as shown in FIG. 2.

Figure 3:
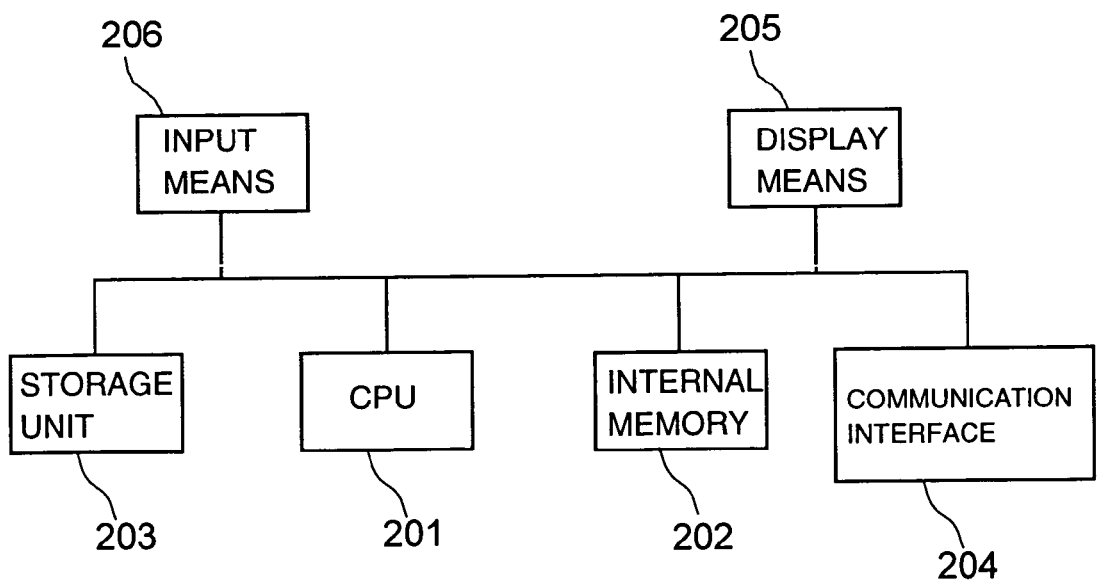
FIG. 3 is a block diagram of the internal unit configuration of an object data receiving unit according to the same embodiment.

The object data receiving unit P2 is, for example, a general-purpose computer with a browser function, comprising a CPU 201, internal memory 202, external storage unit 203 such as HDD, communication interface 204 such as a modem for connection with a communication network, display 205, input means 106 including a mouse or a keyboard, and the like, as shown in FIG. 3.

Figure 26:
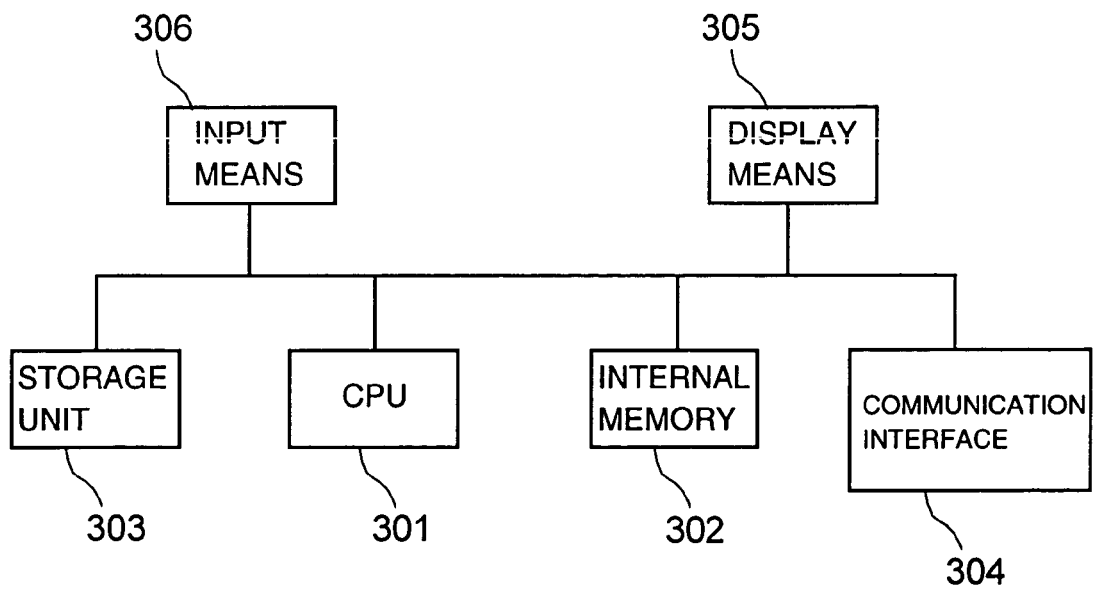
FIG. 26 is a block diagram of the internal unit configuration of the managing unit according to the same embodiment.

The managing unit P3 is, for example, a general-purpose computer capable of exercising the function of a dataware house or the like, comprising a CPU 301, internal memory 302, external storage unit 303 such as HDD, communication interface 304 such as a modem for connection with a communication network, display means 305 such as a display, input means 306 including a mouse or a keyboard, and the like, as shown in FIG. 26.

Figure 4:
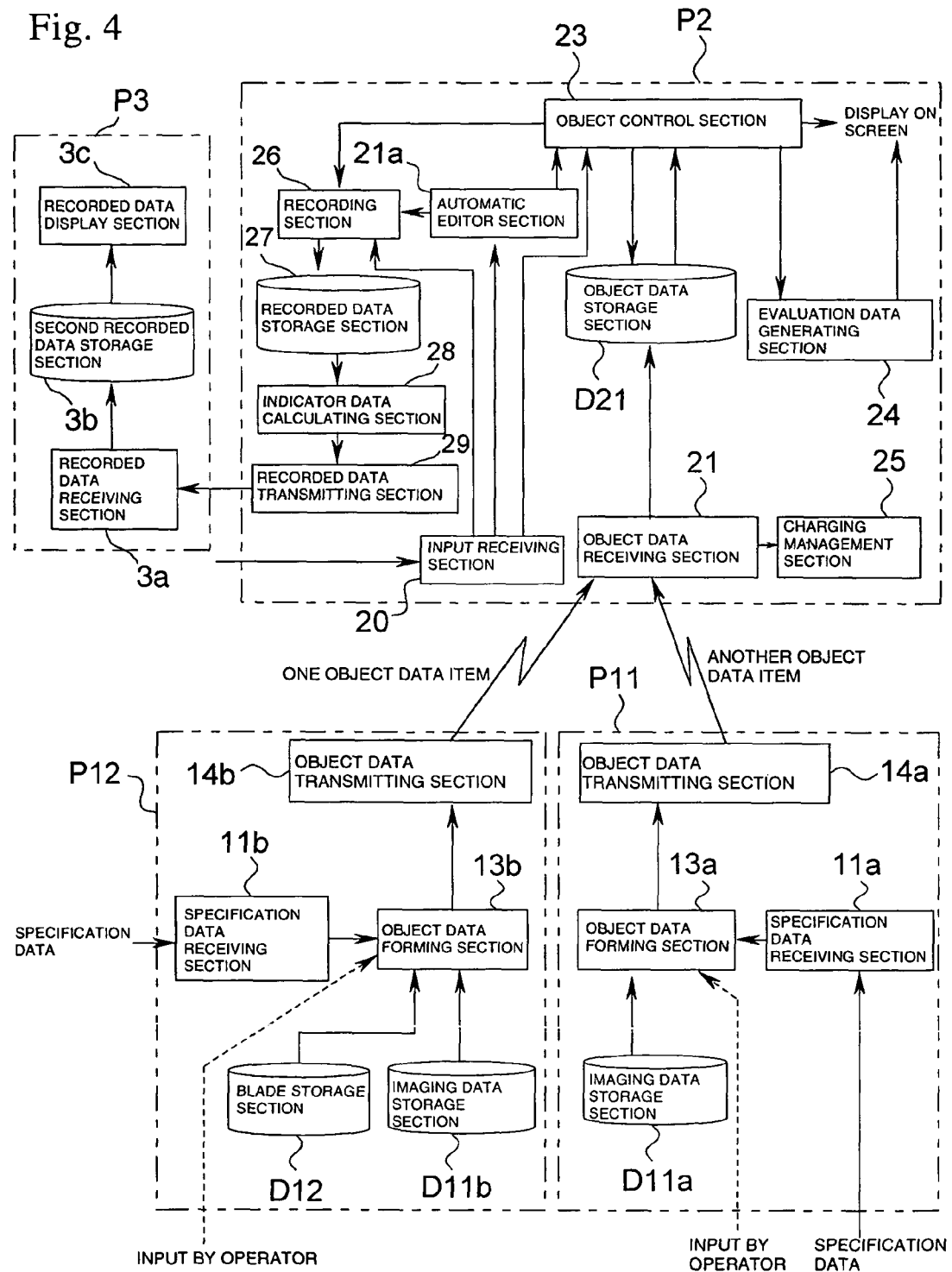
FIG. 4 is a function block diagram illustrating the overall functional configuration of the system according to the same embodiment.

In this embodiment each of the object data transmitting units P11 and P12 is installed with a predetermined program, based on which the CPU 101 and its peripheral devices will be caused to cooperate with each other, so that the object data transmitting unit P11 is imparted with the functions of imaging data storage section D11a, specification data receiving section 11a, object data forming section 13a, object data transmitting section 14a and the like while the other object data transmitting unit P12 imparted with the functions of imaging data storage section D11b, blade storage section D12 as a unit control data storage section, specification data receiving section 11b, object data forming section 13b, object data transmitting section 14b and the like, as shown in FIG. 4.

On the other hand, the object data receiving unit P2 is installed with a predetermined program in the form of plug-in to the browser, based on which program the CPU 201 and its peripheral devices will be caused to cooperate with each other, so that the object data receiving unit P2 is imparted with the functions of input receiving section 20, object data storage section D21, object data receiving section 21, automatic editor section 21a, object control section 23, evaluation data generating section 24, charging management section 25, recording section 26, recorded data storage section 27, indicator data calculating section 28, recorded data transmitting section 29 and the like.

The managing unit P3 is installed with a predetermined program, based on which the CPU 301 and its peripheral devices will be caused to cooperate with each other, so that the managing unit P3 is imparted with the functions of recorded data receiving section 3a, second recorded data storage section 3b, recorded data display section 3c and the like.

Detailed description will be made of each of the sections mentioned above.

The specification data receiving section 11a of the object data transmitting unit P11 is adapted to receive specification data, which is data on the specifications of a product to make. Such specification data may be data on the specifications of the intended product itself, data on the specifications of an intermediate product, such as a mold, for use in producing the intended product, or data on the process for producing the intended product. As shown in FIG. 5, the specification data used in this embodiment includes data on the shape of the intended product, data on the number of products to produce per unit period, and data on the material of the intended products.

Figure 6:
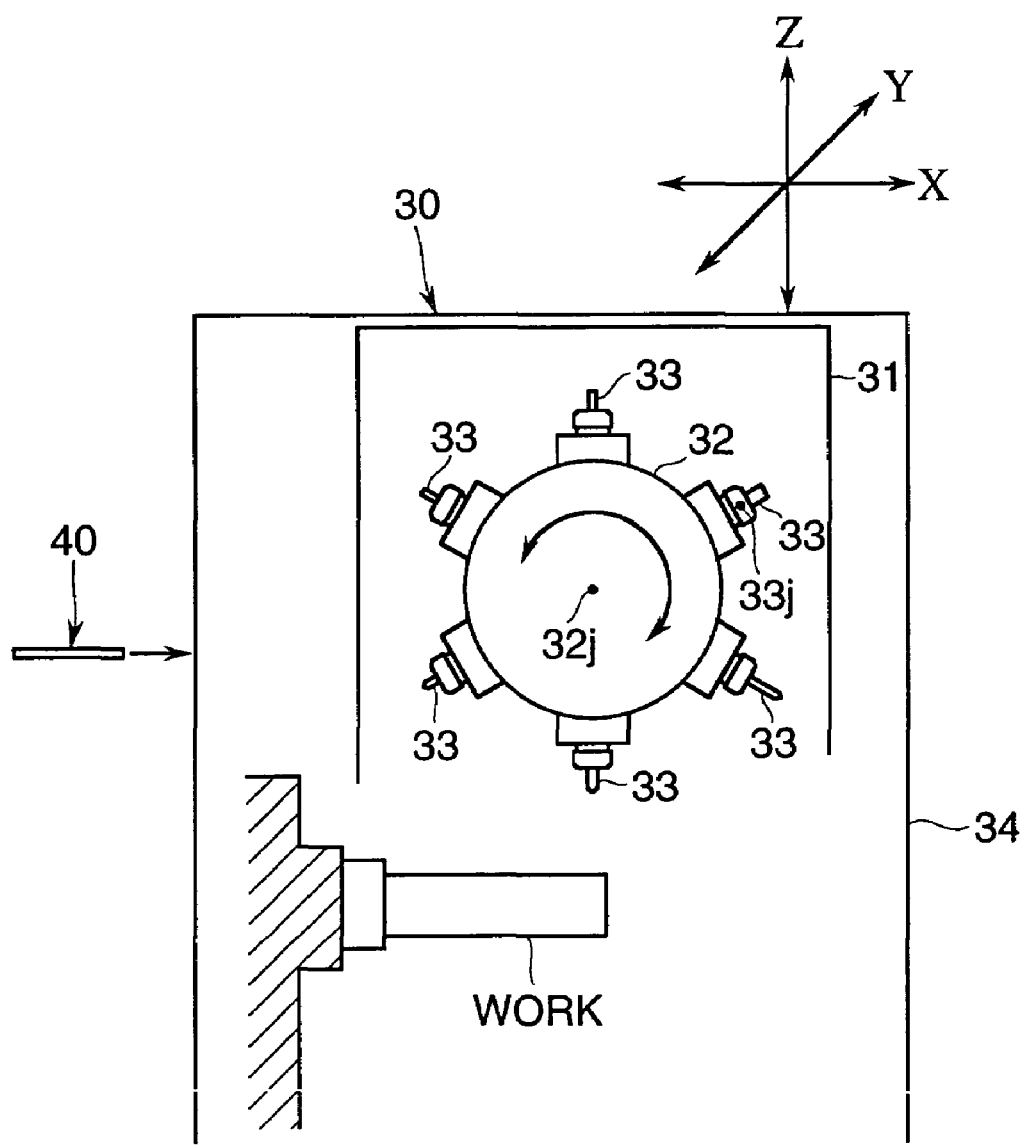
FIG. 6 is an illustration of a functional object according to the same embodiment.

The imaging data storage section D11a has stored therein at least one imaging data item for imaging a MC as a three-dimensional functional object in a virtual three-dimensional space, the MC being one functional resource to be utilized in directly or indirectly producing the product. While all the functional objects to be described later are of three-dimensional shape, they may, of course, be of two-dimensional shape. Such a MC can be chosen from a lineup of MCs assorted by an equipment manufacturer for example. MC object 30, which is a functional object imitating the MC in the virtual space, comprises a plurality of part objects 31, 32, 33, 34 . . . , as shown in FIG. 6. Specifically, the MC object 30 comprises plural machining tool objects 33, head object 32 to which the machining tools 33 are attached, head holder object 31 supporting the head object 31 for rotation to allow each machining tool object 33 to be automatically replaced with a substitute, the head holder object 31 being movable triaxially of body object 34.

Thus, imagine data on the MC object includes outward shape data on the part objects 31, 32, 33, 34 . . . , structure data on a structure allowing the part objects 31, 32, 33, 34 . . . to operate, and optionally surface data on patterns, colors and the like of surfaces. Further, the imaging data is internally or externally related to a name identifier of the functional object 30 previously classified in accordance with the structure data or the like. The imaging data can be obtained by using a three-dimension measuring instrument, or CG, CAD or the like capable of forming three-dimensional shapes.

Figure 7:
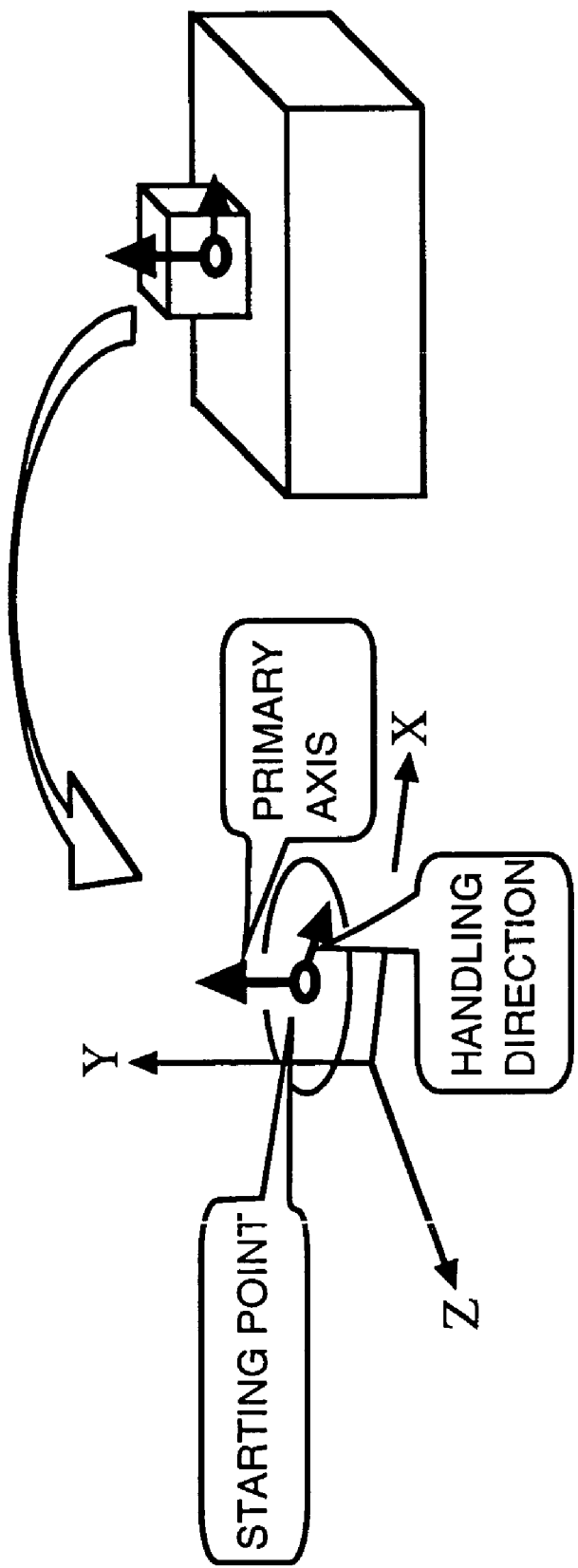
FIG. 7 is an explanatory view illustrating a joint according to the same embodiment.

The aforementioned structure data is indicative of a structure formed by coupling the part objects 31, 32, 33, 34 . . . together via joints 32j, 33j . . . , which are each described as a set comprising starting point coordinates, a vector component along the primary axis, and a vector component in the handling direction, as schematically shown in FIG. 7. Basically, each joint can be described with different degrees of freedom by the "presence or absence" of a primary axis vector and that of a handling direction vector and definition of their attributes. Through these joints 32*j*, 33*j* . . . , the part objects 31, 32, 33 . . . are coupled to their upper-level part objects 31, 32, 33 . . . with respective degrees of freedom defined. In the MC object 30 for example, the head holder object 31 is coupled to the body object 34 via the intervening joint (not shown) so as to have a degree of freedom permitting movement along the three axes (x, y, z), the body object 34 being the uppermost-level part object. Coupling of each object group can be achieved in various manners; for example, by specifying an object group by drag & drop using a mouse, by specifying an object group picked up with the mouse, or by selecting an object group from a list of objects. This embodiment is configured such that in coupling one functional object and another functional object each having plural joints together in the virtual space, the joints of the former object being capable of coupling to those of the latter object in the virtual space, the one functional object is coupled to the aforesaid another functional object under the relative spatial specified coupling conditions of plural object groups designated for coupling which are closest to the joints of the one functional object. In such a case coupling may be achieved under conditions other than those described above, for example, by utilizing a joint of higher priority.

The head object 32 is coupled to the head holder object 31 via joint 32*j* so as to be rotatable along y-axis only, while each of the machining tools 33 coupled to the head object 32 via joint 33*j* so as to be only rotatable about its axis in the radial direction. The posture and position of each of the part objects 31, 32, 33 . . . are determined in terms of a three-dimensional local coordinate system in which each of the joints 32*j*, 33*j* . . . of their upper-level part objects 31, 32, 33 . . . serves as the origin of the coordinate system, thus determining a motion of the whole structure 30. The outward shape data is polygon data or the like on a curve or curved surface lying at a predetermined position in the three-dimensional local coordinate system defining the structure 30, while the surface data is indicative of a pattern or color pasted to the surface by texture mapping or the like. The structure of the object data is not limited to the structure described above and may be varied differently.

Figure 8:
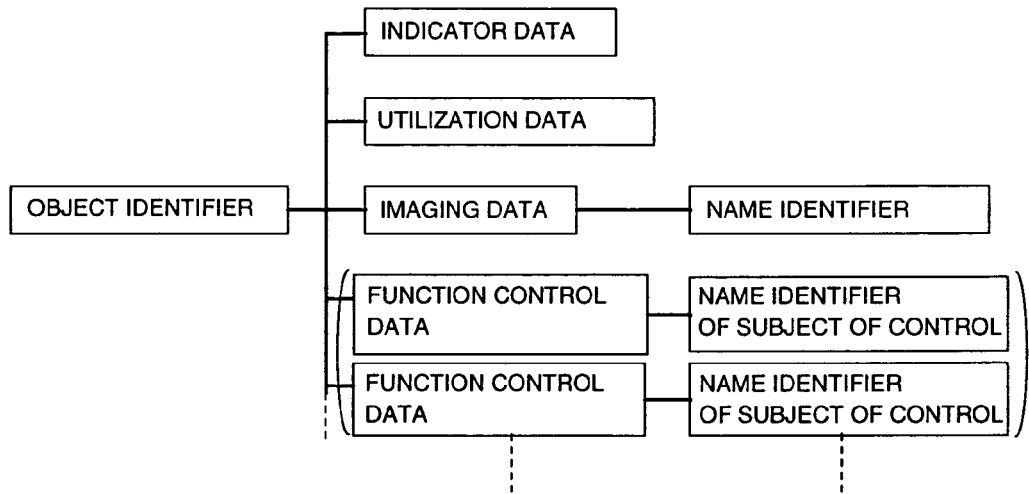
FIG. 8 is a diagram illustrating the data structure of object data according to the same embodiment.

The object data forming section 13*a* is configured to select imaging data related to one or plural MC objects having the function of satisfying the specifications of an intended product from those data stored in the imaging data storage section D11 and attach the name identifiers of the MC objects, which are previously related to the selected imaging data, to the selected imaging data, thereby forming object data. Imaging data may be selected based either on an instruction inputted by the operator or on automatic judgment from the contents of the specification data with optional intervention of an instruction inputted by the operator. Though the object data may include function control data to be described later in addition to an object identifier identifying the function object of interest and the imaging data and name identifier as seen from its structure shown in FIG. 8, the object data forming section 13*a* forms object data not including such function control data. In this embodiment the object data includes utilization data, which is data on utilization of the object. Though not shown, the utilization data is structured to record the amount of object data, a log indicative of the history of imaging according to imaging data in the virtual space, and a log indicative of the history of operation on a functional object as a subject of control to perform editing as to position or structural recombination or of the history of provocation or creation of the function of the object. The object data further includes indicator data obtained by calculation at the indicator data calculating section 28 to be described later.

The object data transmitting section 14*a* is configured to transmit object data formed by the object data forming section 13*a* to the object data receiving unit P2.

The imaging data storage section D11*b* of the other object data transmitting unit P12 has stored therein one or plural imaging data items for displaying a recording medium (for example FDD) storing a MC control program recorded therein as an FDD object 40 (shown in FIG. 6) in the virtual three-dimensional space, the recording medium being another functional resource incorporated in the MC to cause the MC to exhibit its function. Such an imaging data item comprises outward shape data and, optionally, surface data indicative of a pattern, a color or the like.

The object data forming section 13*b* is configured to form object data by fetching imaging data on the FDD from those stored in the imaging data storage section D11*b*, attaching the name identifier of the FDD object 40, which is previously related to the fetched imaging data, to the selected imaging data, and further adding function control data to the fetched imaging data along with the name identifier of the MC object 30, the function control data being for causing the MC object to exhibit a function satisfying the aforementioned specifications in the virtual space. It should be noted that settings are made to judge whether the FDD object 40 has been incorporated into the MC object 30 based on the structural relation between items of object data in the virtual three-dimensional space defined in a local coordinate system in terms of which either the FDD object 40 or the MC object 30 is represented. Where there are plural MC objects, plural items of function control data corresponding to the respective MCs may be included in respective plural items of object data. The object data formed by the object data forming section 13*b* further includes utilization data similar to that included in the object data formed by the object data forming section 13*a*.

More specific description will be made of the process of forming the function control data at the object data forming section 13*b*. Based on the specification data, plural blades, which are unit control data items, are fetched from the blade storage section D12 and combined together and, if necessary, parameters based on the specification data are given, whereby the function control data serving to provoke or create the function of the MC object is formed. At that time the object data forming section 13*b* references the names of usable functional objects described on each blade, as well as hierarchy information (not shown). An instruction inputted from the operator may intervene in a part of the process.

Figure 9:
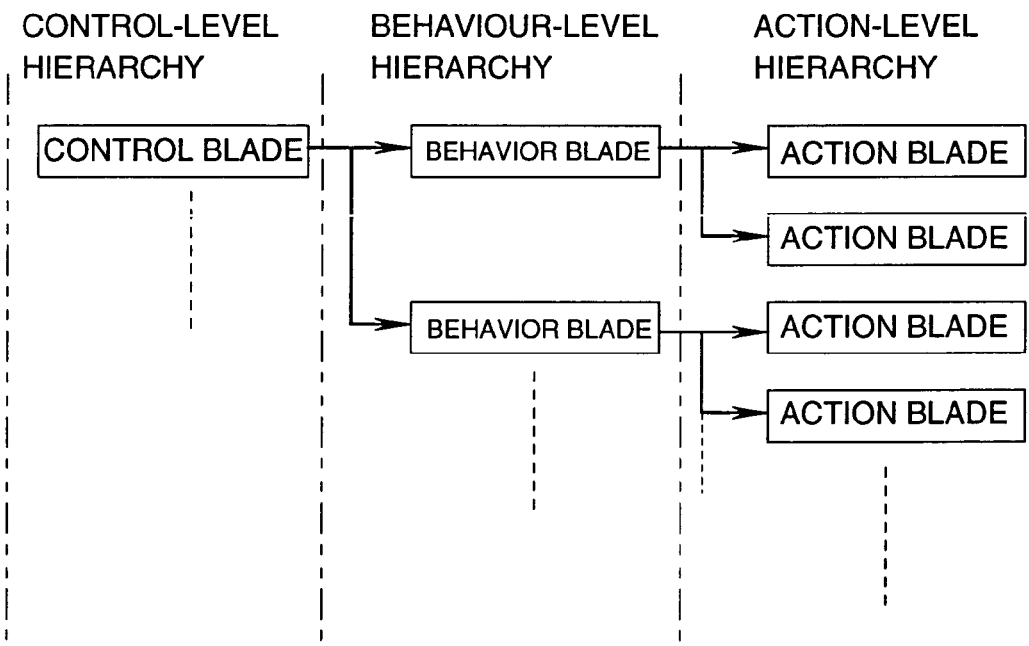
FIG. 9 is a diagram illustrating the data structure of function control data according to the same embodiment.

The function control data can be added, deleted or modified independently of the imaging data and is of a hierarchical structure comprising a combination of plural blades in which higher-level blades belonging to a higher-level hierarchy are each related to one or plural lower-level blades belonging to a lower-level hierarchy, as shown in FIG. 9.

In this embodiment the hierarchical structure is of three-level hierarchy. One or plural control blades, which are higher-level unit control data on the operation process of the object such as procedural steps, belong to a control-level hierarchy, or the uppermost-level hierarchy, with object indexes for identifying respective objects being related to respective control blades.

One or plural behavior blades, which are intermediate-level unit control data on the principle on which the operation process of the object are divided into smaller pieces, are related to the respective control blades and belong to a behavior-level hierarchy, or the intermediate-level hierarchy.

One or plural action blades, which are lower-level unit control data on the principle of the operation of the object and determine more specific and physical actions of the object, are related to the respective behavior blades and belong to an action-level hierarchy, or the lowest-level hierarchy.

For instance, each control blade is capable of pairing an index of a behavior blade (which may include specification of a path, URL or the like) to be related thereto with an event index indicative of a kind of event and describing the pair. In this example the even index is indicative of "setting of a workpiece" while the behavior index indicative of "drilling". The indexes of such a behavior blade form the description of the subject control blade. While it is possible to describe a combination of plural behavior indexes or a plurality of pairs of an event index and a behavior index, the object data forming section 13 performs selection, combining or pairing based on the specification data.

The behavior blade having the "drilling" index is given the indexes of action blades (which may include specification of a path, URL or the like) to be related thereto. In this example there are four action indexes, namely "selecting a drill", "moving a head holder", "rotating the drill" and "moving the head holder"; however, there may be five or more action indexes or less than four. A combination of such action blades forms the description of the subject behavior blade.

Figure 10:
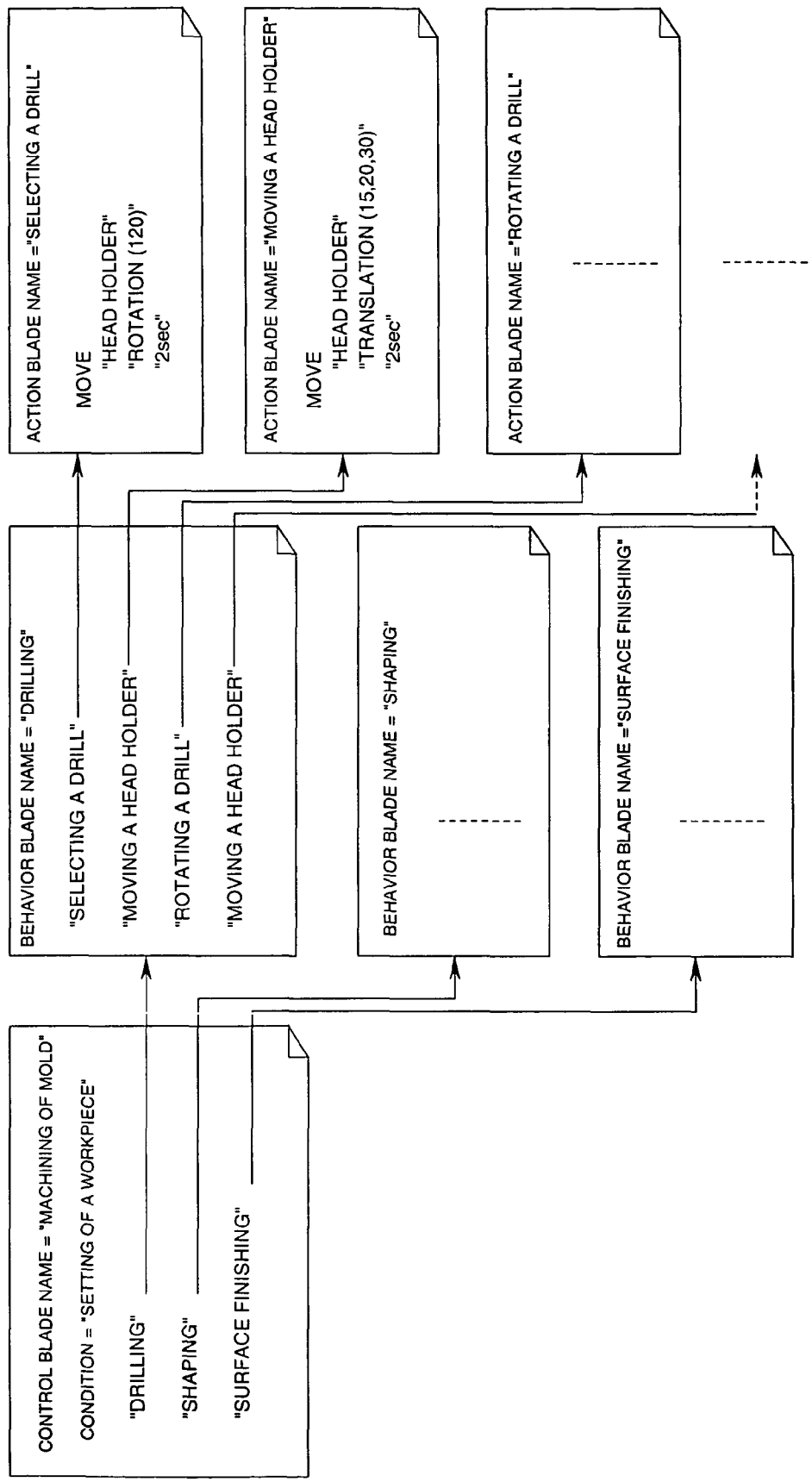
FIG. 10 is a diagram illustrating an example of data included in each blade according to the same embodiment.

Such an action blade is indicative of a motion or a change of form of an object. The term "motion", as used herein, means change in the position and posture of each part object or an assembly of part objects forming the object, while the "change of form", as used herein, means change in the outward shape data or texture of each part object excluding the aforementioned motion, i.e., change in shape, color or pattern. Though this embodiment distinguishes such motion and change of form from each other, they may not be distinguished from each other. More specifically, as shown in FIG. 10, following an identifier indicative of a motion (for example, MOVE) there are described a subject index indicative of a subject comprising all or part of objects to be moved, a motion index indicative of a motion of the subject and time data indicative of a period of time in which the motion completes as a set. There may be described a plurality of such sets. The subject index may describe the part indexes of respective part objects forming the aforementioned structure 30 or the joint indexes for coupling the part objects. Alternatively, the subject index may describe the name of a group comprising plural part objects. The motion index describes change in the posture and position of each part or the like. It is sufficient for such change in posture and position to be described in an appropriate manner. Alternatively, the motion index may describe a parameter or environment variable given from the outside as accompanying a message comprising an instruction or the like. Further, the motion index may be capable of specifying movement or rotation to a predetermined point, a direction and a moving distance, or a direction and an angle of rotation. Alternatively, the motion index may be capable of specifying, for example, curves defined by different equations and moving distances along respective curves or combining the aforementioned specifying methods. The time data may describe a starting time and a terminating time.

Each blade is an item of text data describing a motion or change of form of each part object in a text form for the understanding of the user.

In this embodiment each blade is capable of further comprising processing identifying information for allowing the computer to recognize the type of processing to be performed, parallel processing or sequential processing. For example, the aforementioned indexes can be processed simultaneously if they are bound with the processing identifying information "PARALLEL". When sequential processing is desired, the aforementioned indexes can be processed sequentially if they are bound with the processing identifying information "SEQUENCE" or merely described in series. It should be noted that the processing identifying information is capable of including, in addition to "PARALLEL" and "SEQUENCE", various items of information, such as "REPEAT" indicative of repetition, "RANDOM" indicative of random processing and "WAIT" specifying waiting time, either alone or in combination.

Since the specification data receiving section 11b and the object data transmitting section 14b are similar to the specification data receiving section 11a and the object data transmitting section 14a, description thereof is omitted.

Though not shown, the object data transmitting unit P11 is further provided with a target object selecting section for selecting and fetching work object data for imaging a work object as a subject of machining from a target object storage section not shown based on shape data or material data included in the specification data, a target object transmitting section for transmitting the work object data to the object data receiving unit P2, and the like.

The input receiving section 20 of the object data receiving unit P2 is adapted to receive selected input of plural functional objects made by the user and is constructed by utilizing input means 206 and the like. Specifically, the input receiving section 20 is configured to allow the user to make selection from a pull-down menu not shown or make selection of desired ones from plural functional objects displayed in the virtual space by clicking with a mouse. Further, the input receiving section 20 is configured to receive input of corrected section of functional objects made by the user as well as input of decided selection of functional objects made by the user.

The object data receiving section 21 is adapted to receive object data transmitted from the object data transmitting unit P1. Object data thus received is accumulated in the object data storage section D21 established in a predetermined storage area.

The automatic editor section 21a is adapted to extract uncombinable ones from plural functional objects received by the input receiving section 20 and plural functional objects received by the object data receiving section 21 and establish functional objects that will substitute for the extracted functional objects. Specifically, the automatic editor section 21a of this embodiment is configured to extract uncombinable ones from plural functional objects received by the input receiving section 20 and plural functional objects received by the object data receiving section 21 by comparing their respective name identifiers with second name identifiers and then establish functional objects that will substitute for the extracted functional objects by extracting them from those stored in the object data storage section D21. Further, the automatic editor section 21a of this embodiment is configured to have the function of coupling plural functional objects together by using suitable joints when the plural functional objects in the virtual space are judged as having a predetermined relation therebetween. More specifically, the automatic editor section 21a is configured such that with one functional object being selected in a certain virtual space, for example, by specifying the object by drag & drop with a mouse, by specifying it as an object group picked up with the mouse, or by selecting the object from a list of objects, if there are a plurality of other functional objects having respective joints capable of coupling to the joint of the one functional object in the virtual space, the one functional object is coupled to that functional object of the other functional objects which has a joint most closest to the joint of the one functional object. Alternatively, the automatic editor section 21a may be configured to conduct search throughout the joints of respective functional objects and judge the functional objects to be uncombinable if there is no combinable joints.

The object control section 23 is adapted to interpret and execute control data included in each functional object data item received by the object data receiving section 21 or control data included in each functional object established by the automatic editor section 21a to cause a resulting combination of such functional objects to exhibit functions essential to the combination. Specifically, the object control section 23 is configured to retrieve and extract a MC object incorporating at a predetermined position a FDD object to be imaged in the virtual space based on object data received, interpret function control data on the FDD object if a name identifier accompanying the function control data matches the name identifier of the MC object, and directly or indirectly control the imaging data on the MC object based on the interpretation thus made, thereby performing function control over the MC object in the virtual space.

Figure 11:
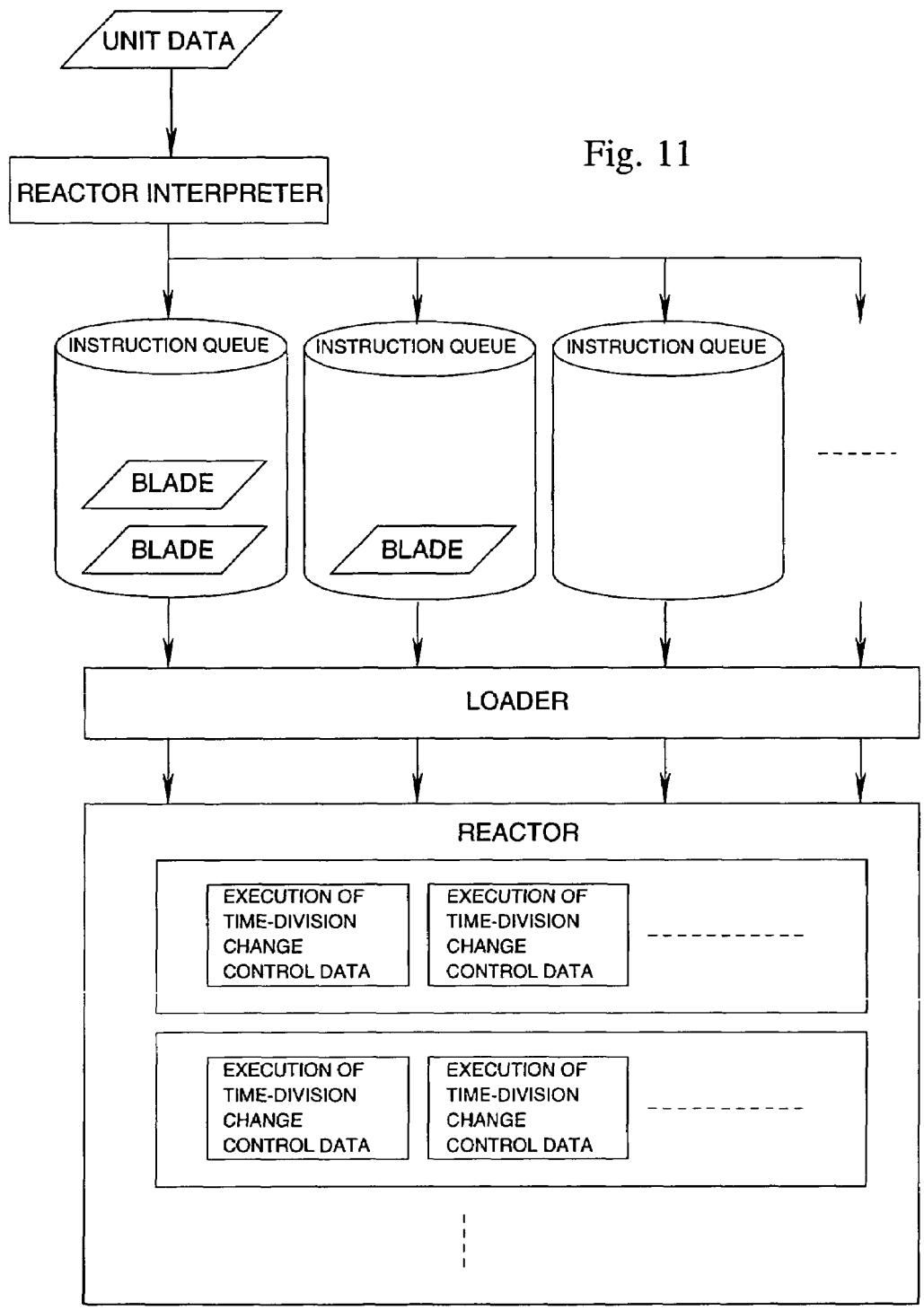
FIG. 11 is an explanatory diagram illustrating processing for provoking or creating a motion or the like according to the same embodiment.

More specifically, as shown in FIG. 11, the object control section 23 interprets and classifies lowermost-level blades (action blades as lower-level unit control data items in this embodiment) into a group of blades to be parallel-processed and a group of blades to be sequential-processed according to processing identifying information included in the function control data fetched, and plays the role of a reactor interpreter accumulating the blades to be parallel-processed in different instruction queues and the blades to be sequential-processed in a same instruction queue according to the sequence of processing. The "instruction queue" is established temporarily or constantly in a predetermined area of the internal memory 102, external storage unit 103 or the like.

The object control section 23 also plays the role of a reactor fetching the blades accumulated in each instruction queue through a loader. This reactor fetches the unit control data items stored in the same queue sequentially from the leading position and creates a motion or a change of form based on time information included therein while independently fetching the blades stored in different instruction queues.

Figures 12, 13:
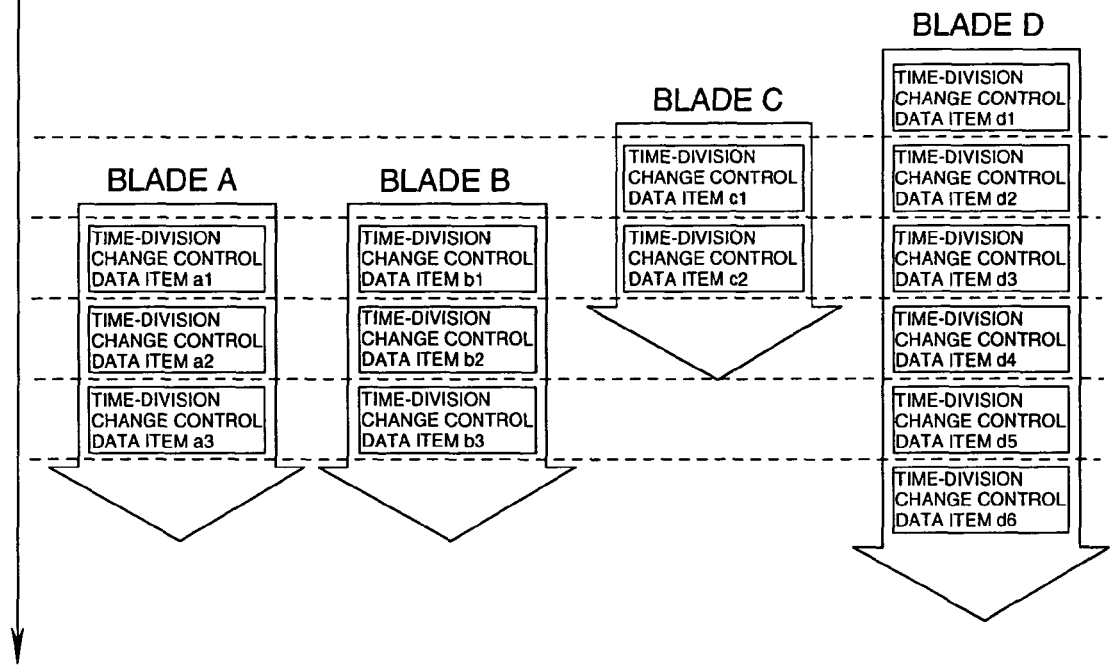
FIG. 12 is an explanatory diagram illustrating a flow of processing for provoking or creating a motion or the like according to the same embodiment.
FIG. 13 is a diagram illustrating an example of description of blade operating data according to the same embodiment.

The reactor performs one processing operation per unit time, for example 0.1 sec and divides each of the blades fetched into time division change control data items for provoking and creating a motion or a change of form on a unit time basis according to the time information (time data) included in the blade. For example, a blade having time information specifying 2 seconds is divided into 20 time division change control data items, while a blade having time information specifying 3 seconds divided into 30 time division change control data items. Then, the reactor specifies a subject to be moved or form-changed from the object data according to the subject index included in each blade and executes the time division change control data items sequentially to provoke or create a motion or change of form of the object. The creation of such a motion or change of form may be achieved either by sequentially adding unit amounts to the first time division change control data item or by giving gradually increasing amount of motion or gradually increasing amount of change of form to the object in the first position constantly serving as a reference position.

Where there are time division change control data items derived from plural unit control data items stored in different instruction queues, these time division change control data items are executed simultaneously on a unit time basis by parallel processing to provoke or create plural motions or changes of form in a parallel fashion. In the case where blades A to D are present in parallel as shown in FIG. 12 for example, due to difference in processing start time determined from such identifiers as WAIT or difference in time required for executions of respective blades to be completed, processing is performed to cause parallel plural motions or changes of form to occur in one part and sequential motions or changes of form to occur in other part.

Further, in this embodiment the object control section 23 is configured to perform addition to or modification or deletion of function control data included in object data independently of imaging data as well as to perform addition, modification or deletion of each blade independently of other blades. That is, blade operating data is provided which is of the same type as function control data but does not include any behavior blade or the like, as shown in FIG. 13. The blade operating data is related to object identifiers and includes pairs of an event index and a data item indicating addition, modification or deletion of each blade. Thus, if the data having an event index that matches the event detected is the blade operating data, the object control section 23 performs addition, modification or deletion of a blade in the function control data item concerned according to the description of the blade operating data. Specifically, a specified blade is added when "ADD" is included in the blade operating data, while a specified blade is deleted when "DEL" is included in the blade operating data. In the case of modification "ADD" and "DEL" are combined. Thus, this configuration allows function control data and each blade to be added, modified or deleted independently of each other and of imaging data.

The evaluation data generating section 24 is adapted to generate and display evaluation data on the time, cost and the like required for a functional object to complete its operation in the virtual space based on the specification data. It is possible that the evaluation data generating section 24 is included in the object data transmitting unit P1 and is configured to calculate evaluation data beforehand and transmit the evaluation data to the object data receiving unit P2 for the evaluation data to be displayed.

The charging management section 25 is adapted to perform processing for making charge in accordance with the amount of data or the number of objects received in response to reception of object data from the object data transmitting unit P11 or P12.

The recording section 26 is adapted to record a history of operation such as user's selective inputting of functional objects received by the input receiving section 20, the history of each functional object established by the automatic editor section 21a and a phenomenon resulting from the function of a functional object caused to be exercised in the virtual space by the object control section. Such data is recorded as recorded data in the recorded data storage section 27 provided in a predetermined area in the internal memory 202 or external storage unit 203 and as utilization data to be included in the object data. While this embodiment is configured such that such data is recorded in the recorded data storage section 27 with the phenomenon and the object identifier being correlated with each other, it is possible to form and record any type of recorded data in accordance with embodiments so long as the recorded data allows evaluation to be made on utilization of an functional object in the virtual space; for example, by recording a pair of a phenomenon and a corresponding imaging data item, by recording a phenomenon and a corresponding function control data item, or by recording a phenomenon and all the data items forming object data as recorded data in the recorded data storage section 27.

The indicator data calculating section 28 is adapted to calculate indicator data for allowing the user to operate the system efficiently based on the recorded data stored in the recorded data storage section 27. More specifically, if the recorded data indicates frequent depressing of a clear key, the probability that the user feels the preceding operation troublesome or difficult or that the preceding operation makes the user hesitate or mistake, is expected to be high. By finding out such a latent pattern or the like from such a history of operation by data mining or the like, the indicator data calculating section 28 calculates usability as indicator data indicating ease of using or understanding the system. The usability can be established appropriately in accordance with embodiments; for example, with 10 ranks of usability established, the indicator data calculating section 29 outputs 10 when the usability is highest and outputs 1 when the usability is lowest. The indicator data to be calculated is not limited to usability and the indicator data calculating section 28 may calculate indicator data that is applicable to marketing as long as the recorded data is about utilization of the system such as frequencies or total length of time of utilization within a fixed period of time.

In this way, the indicator data calculating section 28 calculates indicator data serving as a mark which guides the user to smooth understanding of the function of a whole system to be constructed and the characteristics of an intended product and which allows the user or the system of the invention to evaluate the whole system to be constructed and the intended product advantageously.

The recorded data transmitting section 29, which is adapted to transmit the indicator data calculated by the indicator data calculating section 28 to the managing unit P3, is constructed by utilizing the communication interface 104 and the like. An embodiment is conceivable wherein: the recorded data transmitting section 29 is configured to transmit the recorded data stored in the recorded data storage section 27 to the managing unit P3; and indicator data is calculated by an indicator data calculating section (not shown) included in the managing unit P3 having received the recorded data.

The recorded data receiving section 3*a* of the managing unit P3 is adapted to receive indicator data transmitted from the recorded data transmitting section 29 of the object data receiving unit P2 and is constructed by utilizing the communication interface 304 and the like.

The second recorded data storage section 3*b* is adapted to store indicator data received by the recorded data receiving section 3*a* and is established in a predetermined area of the internal memory 302 or external storage unit 303.

The recorded data display section 3*c* is adapted to display indicator data received by the recorded data receiving section 3*a* or indicator data stored in the second recorded data storage section 3*b* and is constructed by utilizing the display 305 and the like.

An example of operation of the system according to this embodiment will be described in detail with reference to FIGS. 14 to 18, 24 and 25.

First, assume that a product to be made and its specifications are fixed according to a business agreement between a manufacturer of the product and a subcontractor for example. In this case the product to be made is a resin casing of a mobile phone for example. Suppose that the subcontractor makes a mold according to the design specifications of the product and manufactures the casing by injection molding using the mold thus constructed.

Before making the mold, the subcontractor requests that an equipment merchandise center and a technical center, which have business relation to the subcontractor, propose a MC suitable for machining the mold. The equipment merchandise center and the technical center, in turn, receive data on the design specifications of the mold (the above-described specification data) from the subcontractor. Specifically, the subcontractor transmits the specification data from its information processing unit P3 to object data transmitting units P11 and P12. In this case it is possible to send the specification data as recorded in a recording medium such as a FDD or a CD without transmission through a communication channel.

Figure 14:
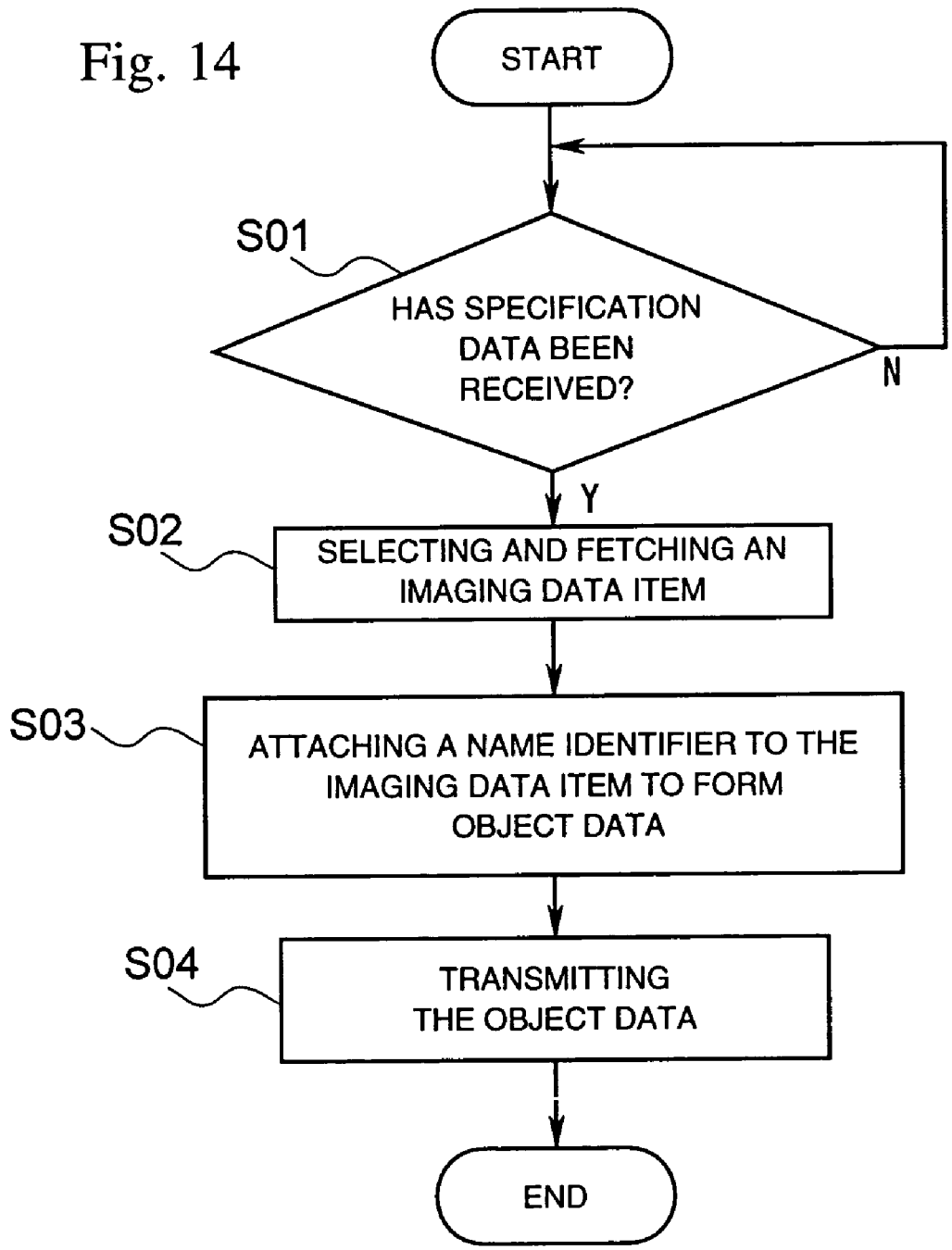
FIG. 14 is a flowchart of an operation of the object data transmitting unit according to the same embodiment.

When the specification data receiving section 11*a* of the object data transmitting unit P11 receives the design specification data (step S01 in FIG. 14), the object data forming section 13*a* selects and fetches an imaging data item on a MC object capable of exercising a function satisfying the specifications of the product from the imaging data storage section D11*a* (step S02 in FIG. 14). Subsequently, the name identifier of the MC object previously related to the selected imaging data item is attached to the imaging data item to form object data (step S03 in FIG. 14). The object data transmitting section 14 in turn transmits the object data thus formed to the object data receiving unit P2 (step S03 in FIG. 14).

Figure 15:
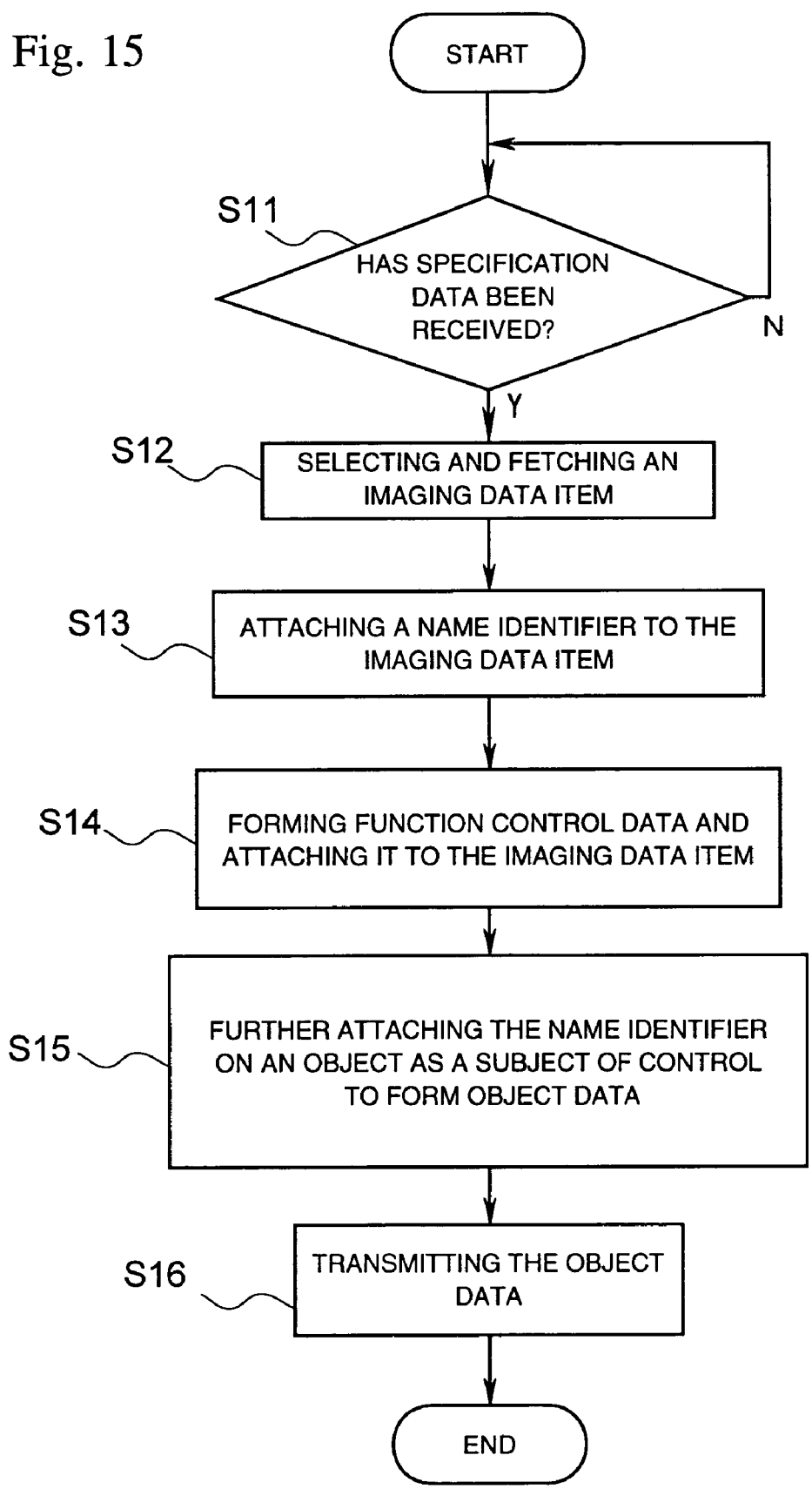
FIG. 15 is a flowchart of an operation of the object data transmitting unit according to the same embodiment.

On the other hand, when the specification data receiving section 11*b* of the other object data transmitting unit P12 receives the design specification data (step S11 in FIG. 15), the object data forming section 13*b* selects and fetches an imaging data item on a FDD object to be incorporated into the MC object from the imaging data storage section D11*b* (step S12 in FIG. 15) and then attach the name identifier of the FDD object previously related to the selected imaging data item to the imaging data item (step S13 in FIG. 15). When the FDD object has been incorporated in the MC object, the object data forming section 13*b* forms function control data for causing the MC object to exhibit the function satisfying the specifications in the virtual space (step S14 in FIG. 15) and then further attach the function control data to the imaging data item together with the name identifier of the MC object to form object data (step S15 in FIG. 15). Thereafter, the object data transmitting section 14*b* transmits the object data thus formed to the object data receiving unit P2 (step S16 in FIG. 15).

Figure 16:
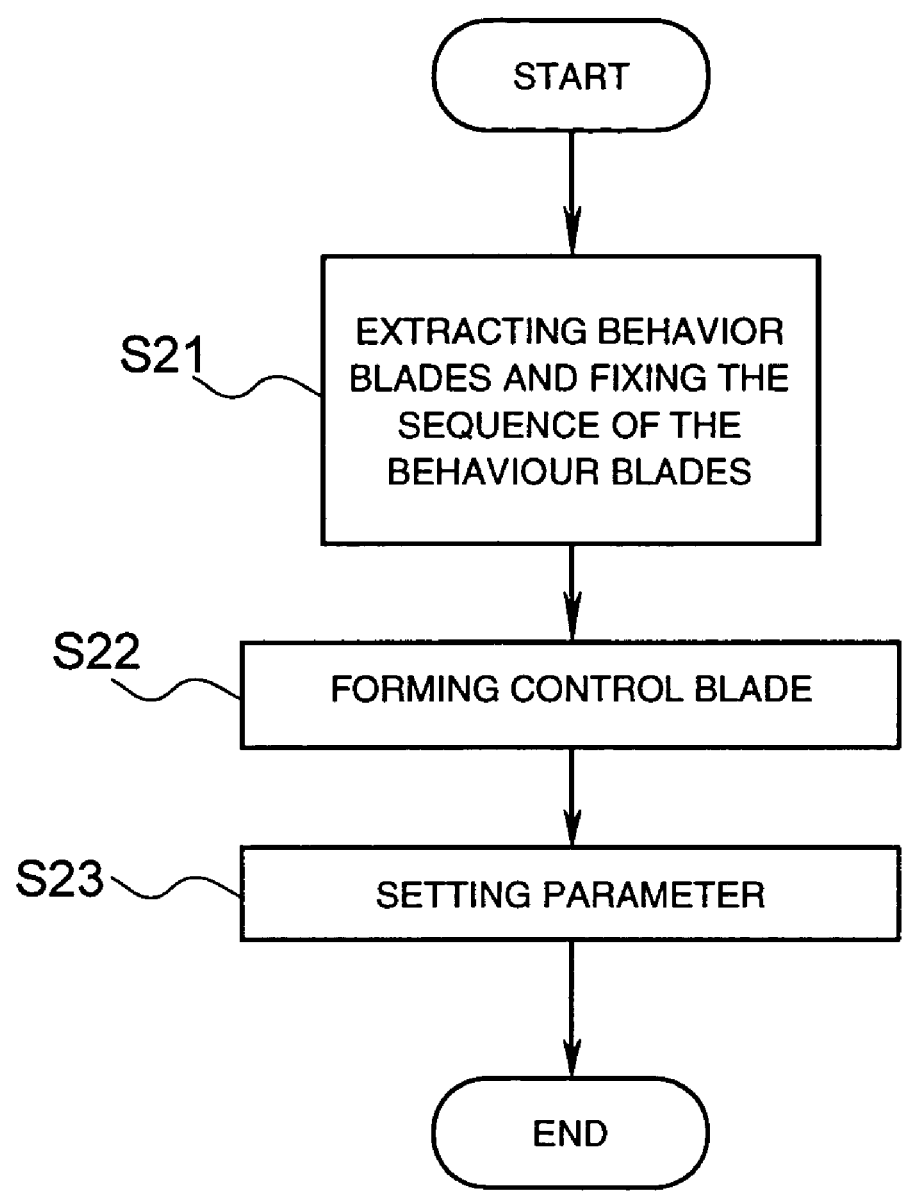
FIG. 16 is a flowchart of an operation of the object data transmitting unit according to the same embodiment.

In forming the function control data, first, behavior blades indicative of procedural steps required for machining the mold are extracted either automatically or by reference to inputs from the operator and the sequence of the behavior blades is fixed in order to fix the description of a control blade based on the specification data (step S21 in FIG. 16). Subsequently, the control blade describing the indexes of the respective behavior blades in the sequence fixed is formed (step S22 in FIG. 16).

In turn, action blades, which are lower-level blades subordinate to each behavior blade, are selected sequentially. In this embodiment, since action blades corresponding to each behavior blade are stored previously for each MC object, the object data forming section 13*b* gives each action blade a parameter based on the specification data (step S23 in FIG. 16). At that time, the object data forming section 13*b* also references the names and hierarchical levels (not shown) of usable functional objects described at each blade.

Referring to FIG. 10 as an example, the description of the behavior blade having the index "drilling" described at the control blade in the object shown is predetermined to include "select a drill", "move the head holder", "rotate the drill" and "move the head holder".

The action indicated by the action blade corresponding to the index "select a drill" for example is to rotate the head holder through $\theta$ in t seconds. The parameters $\theta$ and t are given by the object data forming section 13b referencing the specification data and, optionally, inputs from the operator.

In this way the object data forming section 13b sets the actions of other action blades and the like to form function control data for machining of the mold.

Figure 17:
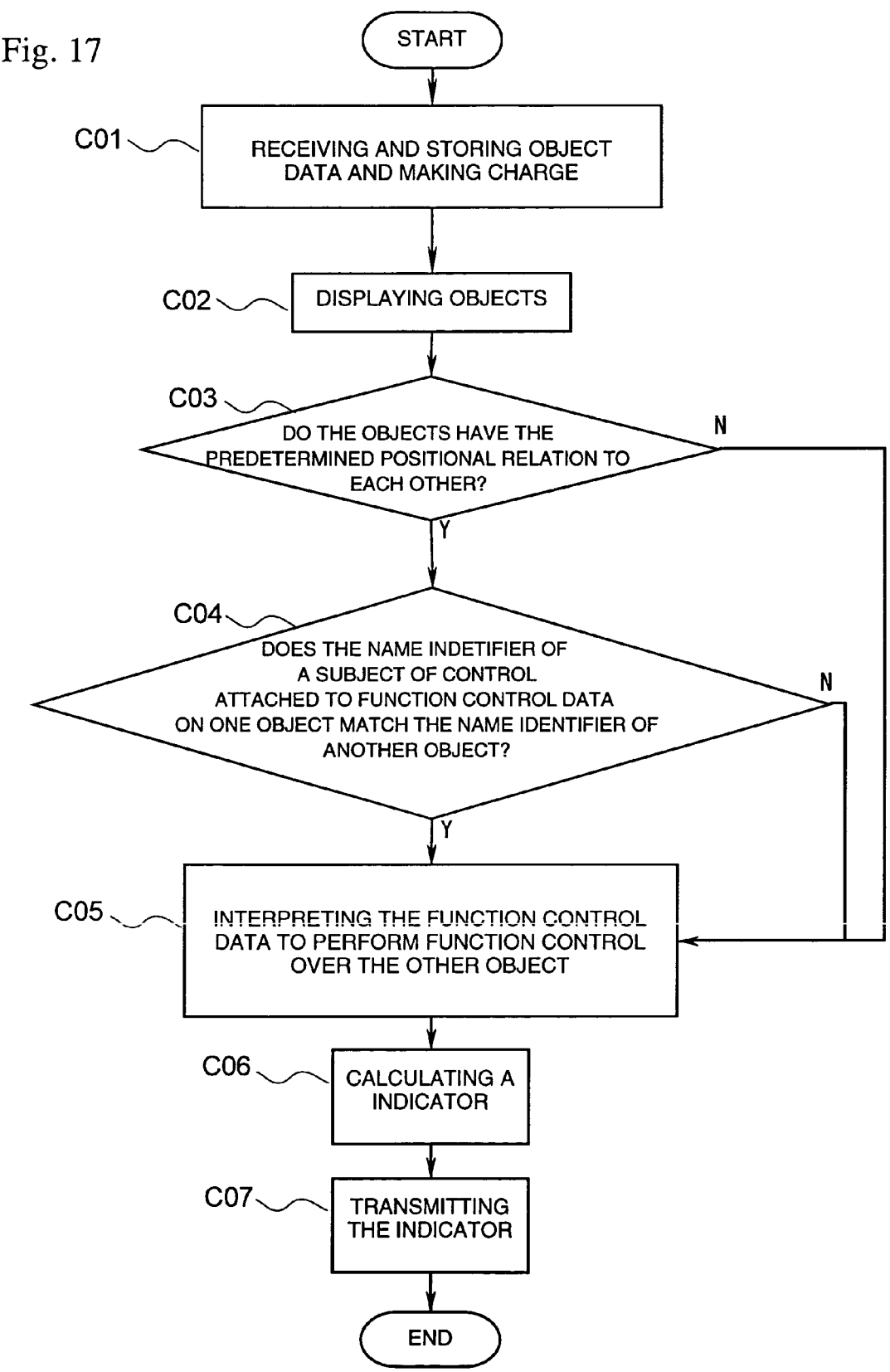
FIG. 17 is a flowchart of an operation of the object data receiving unit according to the same embodiment.

At the object data receiving unit P2, on the other hand, the object data receiving section 21 receives object data transmitted from each of the object data transmitting units P11 and P12 and stores the object data into the object data storage section D21 (step C01 in FIG. 17), while the object control section 23 displays the MC object 30 and the FDD object 40 in the virtual space based on the imaging data included in each object data item (step C02 in FIG. 17). In the case where such object data items have already been accumulated, there is no need to store them. This embodiment is configured such that at step C01 the charging management section 25 performs processing for charging in accordance with the amount of utilization data included in the object data received. The processing for charging performed by the charging management section 25 is not limited to that for charging in accordance with the amount of data, and settings for such processing can be made appropriately, for example, for charging in accordance with the number of objects, or for charging for utilization of the virtual space such as imaging according to imaging data, or provoking or creating the function of an functional object as a subject of control.

Subsequently, the object control section 23 judges whether the FDD object 40 is incorporated in the MC object 30 at a predetermined position (step C03 in FIG. 17). This judgment is made based on the structural relation between the object data items in the virtual three-dimensional space.

More specifically, step C03 has the function of the following subroutine. When the user picks up a desired one of plural objects with a mouse or the like, the input receiving section 20 judges that the picked-up object (FDD object 40) has been selected. For example, when the user moves the FDD object 40 to the predetermined position in the MC object 30 by dragging or the like (step SC11), the automatic editor section 21a first compares the second name identifier of the MC object 30 with the name identifier of the FDD object 40 to judge whether the selected FDD object 40 is combinable with the MC object 30 or not (step SC12). If the FDD object 40 is judged to be combinable, the automatic editor section 21a couples the joints of the respective functional objects together (step SC13). If not, the automatic editor section 21a displays a message to that effect while automatically selecting another object that is combinable with the MC object 30 (step SC14), followed by coupling of the joints of the respective functional objects together.

Thus, when, for example, a salesman inserts the FDD object 40 into the predetermined position in the MC object 30 as shown in FIG. 6 for the purpose of explaining the MC, the object control section 23 judges that the FDD object 40 has been inserted into the predetermined position and compares the name identifier attached to the function control data on the FDD object 40 with the name identifier attached to the imaging data on the MC object (step C04 in FIG. 17). If they match each other, the object control section 23 interprets the function control data and directly or indirectly controls the imaging data on the MC object 30 based on the interpretation to perform function control over the MC object in the virtual space (step C05 in FIG. 17).

Figure 18:
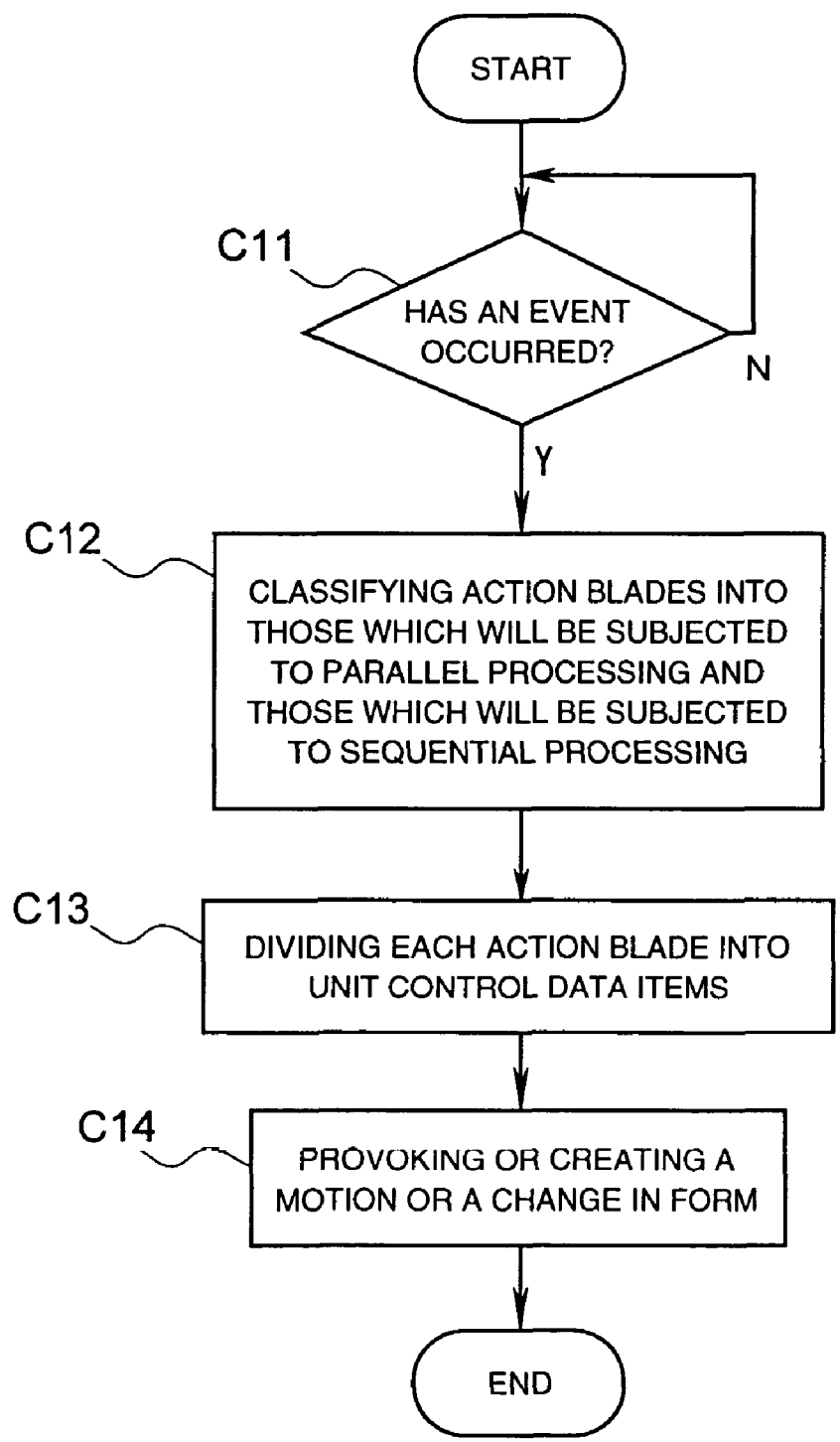
FIG. 18 is a flowchart of an operation of the object data receiving unit according to the same embodiment.

Specifically, when an operation to set a work object for example is effected, this operation (event) is regarded as an opportunity (step C11 in FIG. 18), and action blades, which are unit control data items belonging to the lowest-level hierarchy, are classified into those which will be subjected to parallel processing and those which will be subjected to sequential processing according to processing identifying information included in the function control data (step C12 in FIG. 18). Those action blades which will be subjected to parallel processing are accumulated in different instruction queues, while those action blades which will be subjected to sequential processing are accumulated in a same instruction queue. Thereafter, based on the time data included in each of these action blades, each action blade is divided into time division change control data items (step C13 in FIG. 18), which in turn are subjected to parallel processing or sequential processing on a unit time basis (step C14 in FIG. 18).

As the MC object 30 acts to perform a drilling operation as described above, the shape of the work object changes synchronously with the operation of the machining tool object as if the work object were machined.

Thereafter, the evaluation data generating section 24 generates and displays evaluation data characteristic of the operation of the functional resource performed based on the specifications such as the time required for the MC object to complete machining of the mold in the virtual space, and the cost incurred for electric power and the like.

This embodiment is configured such that upon completion of step C05 the indicator data calculating section 28 calculates indicator data for allowing the user to operate the system efficiently based on the recorded data including the history of operation at steps C01 to C05 (step C06) and then the recorded data transmitting section transmits the indicator data thus calculated to the appropriate unit (step C07).

At the managing unit P3, on the other hand, when the recorded data receiving section 3a receives the indicator data transmitted from the object data receiving unit P2 (step T01), the indicator data thus received is stored in the second recorded data storage section 3b (step T02). In turn, the recorded data display section 3c displays the indicator data received by the recorded data receiving section 3a or stored in the second recorded data storage section 3b (step T03).

This embodiment thus configured is capable of displaying a functional resource that can satisfy received specification data as a functional object in a virtual space while allowing the functional object to exhibit a function satisfying the specification data dynamically in the virtual space. As a result, this embodiment enables the user to grasp the effect of such a functional resource reliably and clearly prior to the introduction of the functional resource, although prior evaluation on the introduction of the functional resource or prior comparative evaluation on the functional resource has heretofore been considered very difficult. Further, this embodiment is capable of greatly contributing to the business operation, sales promotion and the like of equipment machinery makers.

Since imaging data and function control data are independent of each other in this embodiment, development thereof is easy. Further, since such function control data can be realized by a combination of quantized and standardized unit control data items, it is possible to completely automate dynamic formation of function control data in accordance with specification data.

Further, since this embodiment can accommodate modifications of specifications by merely modifying, adding or deleting unit control data items, very rapid processing becomes possible without any burden on communications.

Further, this embodiment is capable of telling the user the usability as indicator data indicative of the ease of using or understanding the system of the invention and the like based on the indicator data calculated by the indicator data calculating section 28 as well as of being advantageously used in marketing.

Moreover, since the managing unit P3 receives and stores a plurality of indicator data items calculated by the indicator data calculating section 28, it is possible to analyze the correlation between such indicator data items thereby to realize more effective marketing activities.

A possible variation of this embodiment can provide a layout in which plural functional objects including a conveyor system are disposed and perform simulation based on the layout. In selecting plural layouts or functional resources, this variation is capable of running their respective simulations easily and quickly and hence allows comparative evaluation thereon to be effected practically.

While the foregoing embodiment is configured to form a novel object data item based only on specification data, another possible variation may be configured to reference data on existing environments so as to allow the user to evaluate the effect of modification or change of a layout of existing functional resources, the effect of addition of a novel functional resource to such existing functional resources, or a like effect.

If the subject is a MC or the like as in the foregoing embodiment, another variation is possible which is configured to automatically convert the results of operation of such a MC in the virtual space into a machining program (G code or the like) for actual use. With such a variation, inputting of only specification data allows actual production to be started immediately after the results have been checked.

Of course, the functional object is not limited to a machine for production equipment such as a MC and may be a device for designing an article to be produced or sold. For example, simulation of behavior of a running vehicle having a replaced suspension can be performed very easily by independently developing only object data on a suspension object. Specifically, though not shown, such a configuration will suffice wherein function control data included in the suspension object is formed to control a vehicle body object, conforming to physical laws related to the suspension function, the weight of the vehicle body and the like. With such function control data, even designing or evaluation of a novel suspension can be achieved very rapidly without the need to take the vehicle body into consideration.

Figure 19:
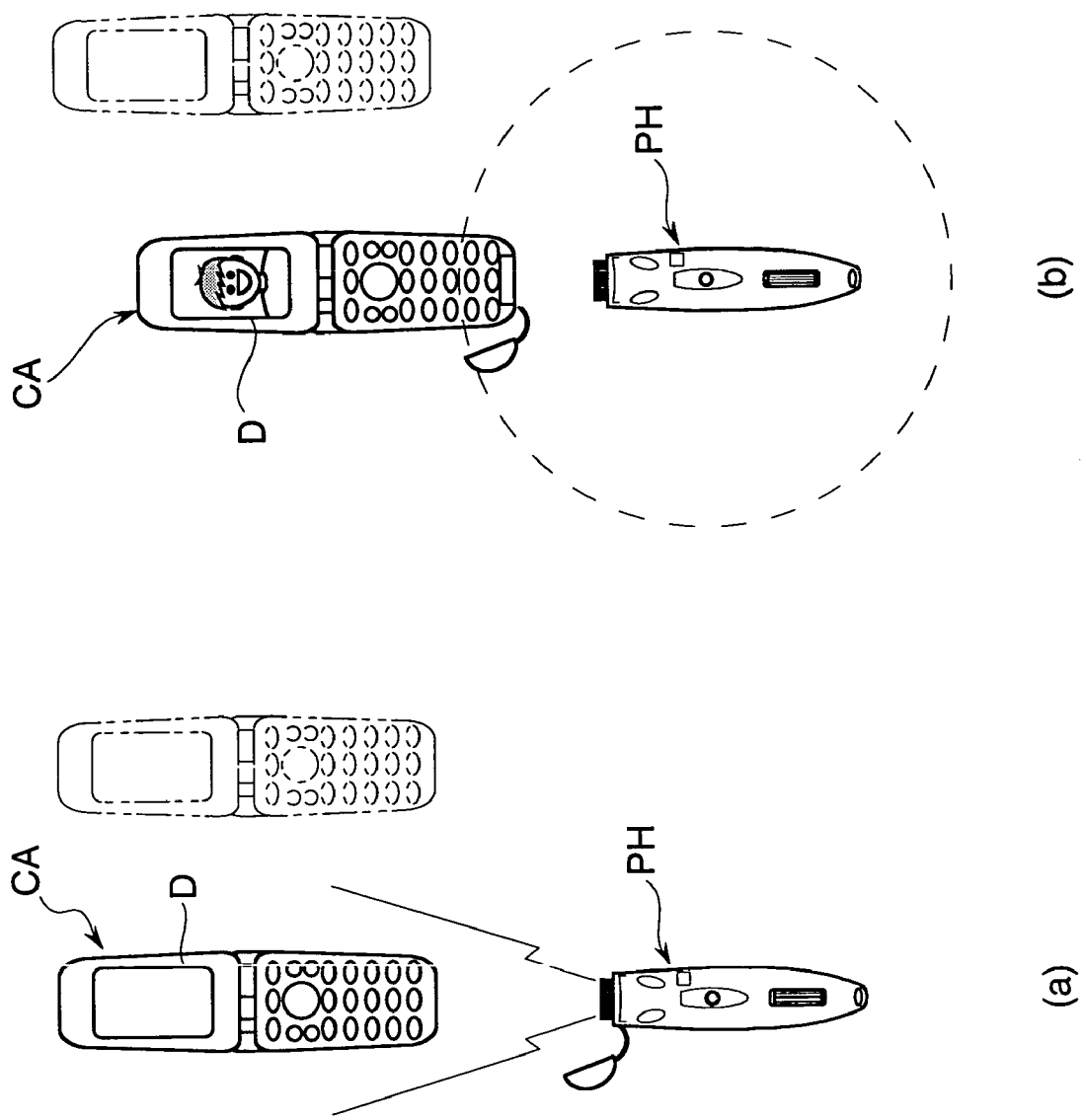
FIG. 19 is an illustration of a functional object according to another embodiment of the present invention.

Alternatively, as shown in FIG. 19, in making a digital camera cooperate with a mobile phone through infrared or radio communication it is possible to check in a virtual space how an image taken by the digital camera is displayed on the mobile phone. Specifically, it is possible to construct a system wherein: object data on a camera object CA includes function control data for controlling the form of a mobile phone object PH (particularly the form of display D in this case); and when the camera object CA is located to have a certain spatial relation to the mobile phone object PH in the virtual space, the function control data on the camera object CA included in the object data acts to control imaging data on the mobile phone object PH so that the image is displayed in the display D. The "spatial relation", as used herein, is meant to include a positional relation allowing the user to view the mobile phone object PH and the camera object CA along a straight line (solid line in FIG. 19(a)), and a positional relation enveloped by a spherical surface in the space (solid line in FIG. 19(b)). An example of a representative configuration for judging whether the mobile phone object PH and the camera object CA are located to have the positional relation allowing the user to view the mobile phone object PH and the camera object CA along a straight line (solid line in FIG. 19(a)) or not (phantom line in FIG. 19(a)) is based on infrared communication between the mobile phone object PH and the camera object CA. On the other hand, an example of a representative configuration for judging whether the mobile phone object PH and the camera object CA are located to have the positional relation enveloped by a spherical surface (solid line in FIG. 19(b)) or not (phantom line in FIG. 19(b)) is based on bluetooth communication between the mobile phone object PH and the camera object CA.

In this way the judgment whether the camera object CA is made to cooperate with the mobile phone object PH or not is made based on the spatially positional relation between these objects in the virtual space.

Figure 20:
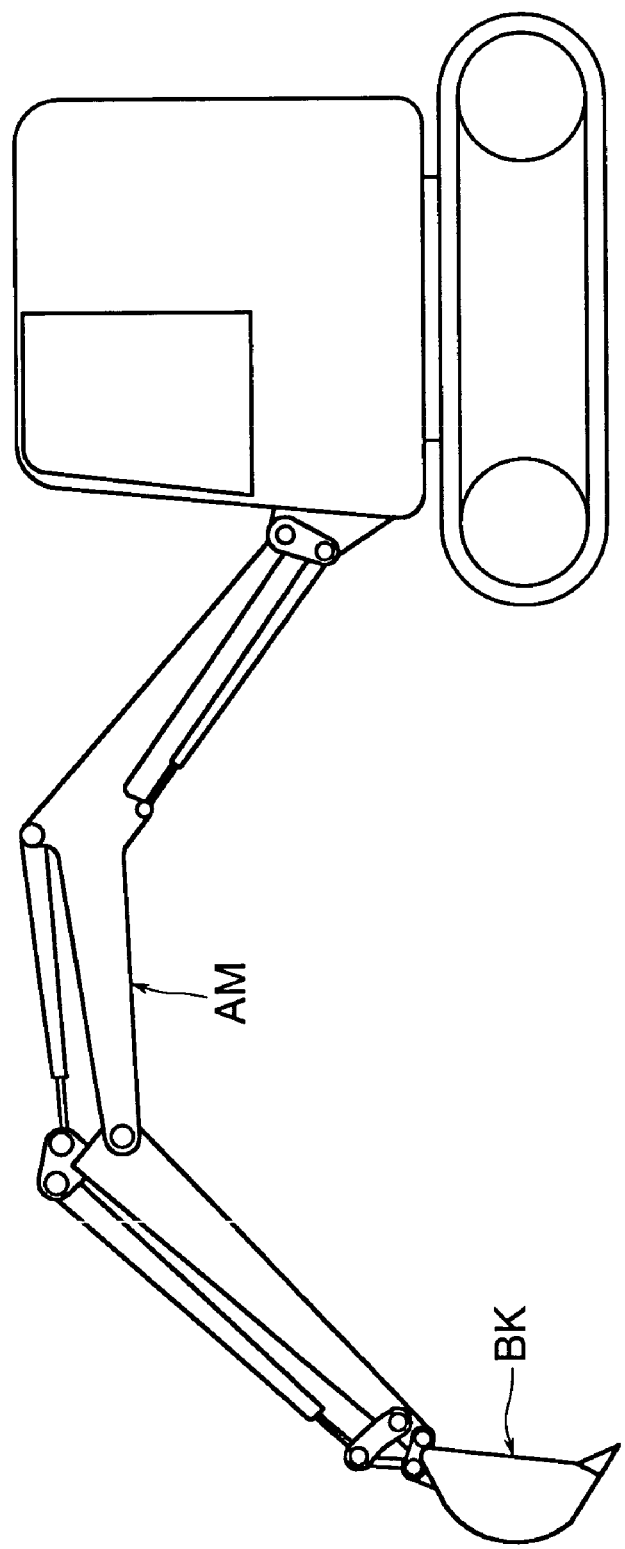
FIG. 20 is an illustration of a functional object according to yet another embodiment of the present invention.
Figure 21:
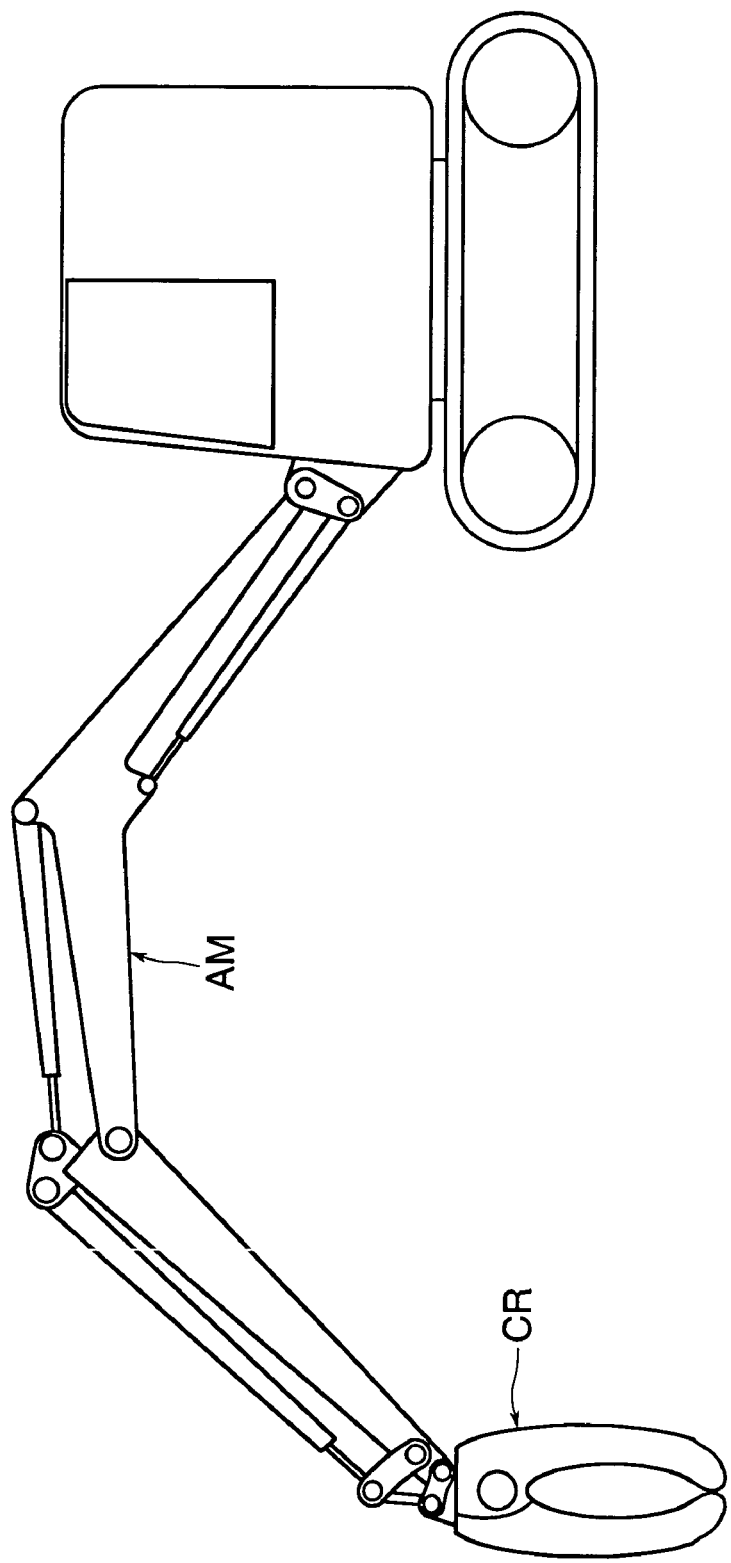
FIG. 21 is an illustration of a functional object according to the same embodiment.
Figure 22:
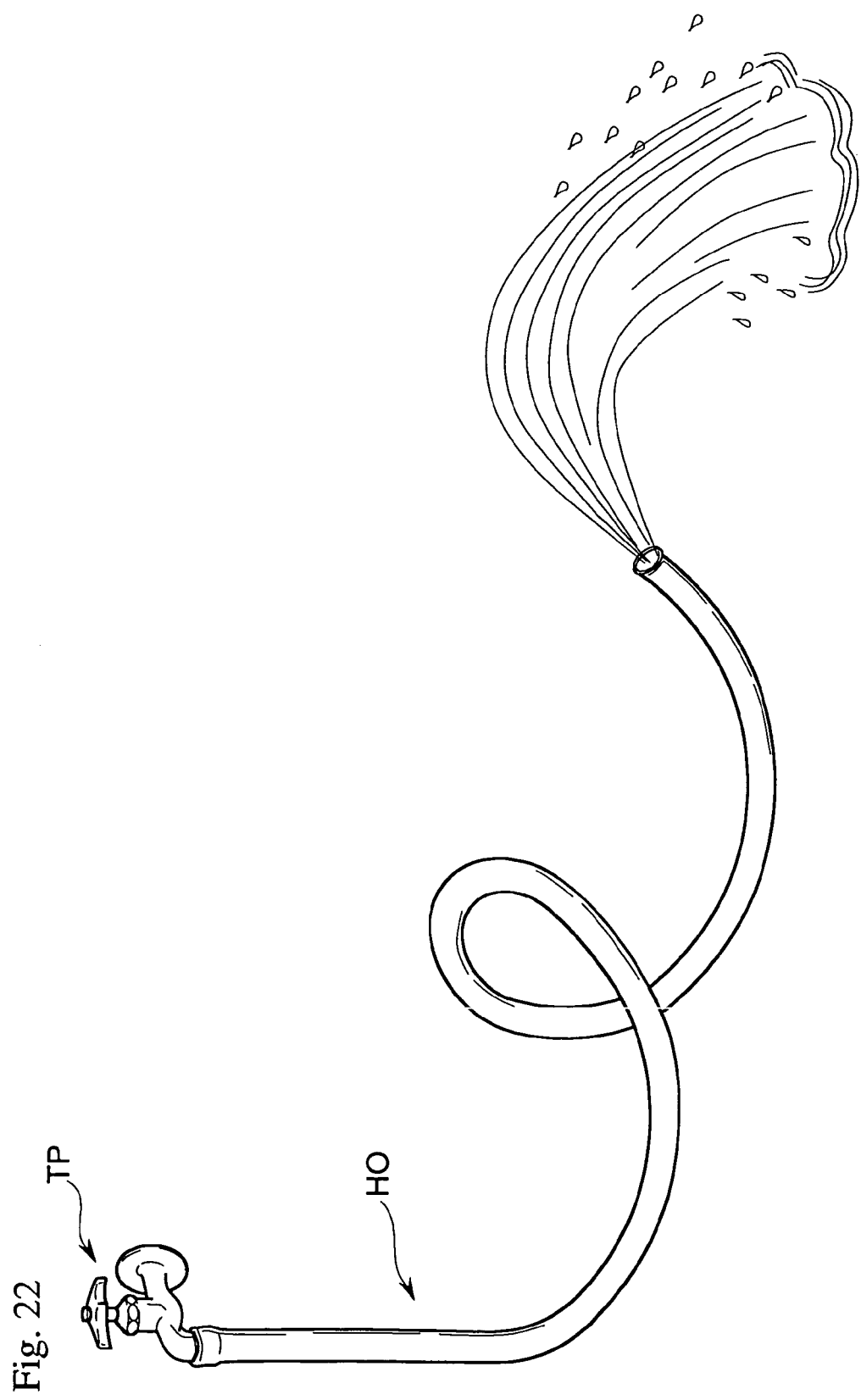
FIG. 22 is an illustration of a functional object according to still yet another embodiment of the present invention.

It is also possible to image and evaluate a change in the function of an arm crane resulting from replacement of an attachment attached to the leading end of the arm in a virtual space. Specifically, assuming that a bucket is to be replaced with a crasher, in actuality the arm needs to be replaced with a thicker one before attaching the crasher in view of the strength of the arm. In replacing the arm with a thicker one in the virtual space, function control data included in bucket object BK and function control data included in crasher object CR should control the form of counterpart arm object AM to which they are to be attached. Specifically, if initially the bucket object BK is attached to the arm object AM as shown in FIG. 20, the form of the arm object AM is defined by the function control data included in the bucket object BK. When the bucket object BK is replaced with the crasher object CR, the function control data included in the crasher object CR can cause the arm object AM to become thicker. Such a configuration allows the user to recognize the effect of replacement visually and clearly. The time at which the computer recognizes the fact that the bucket object BK or the crasher object CR has been attached to the arm object AM, is judged based on the structural relation between the bucket object BK or the crasher object CR and the arm object AM in the virtual three-dimensional space.

Figure 23:
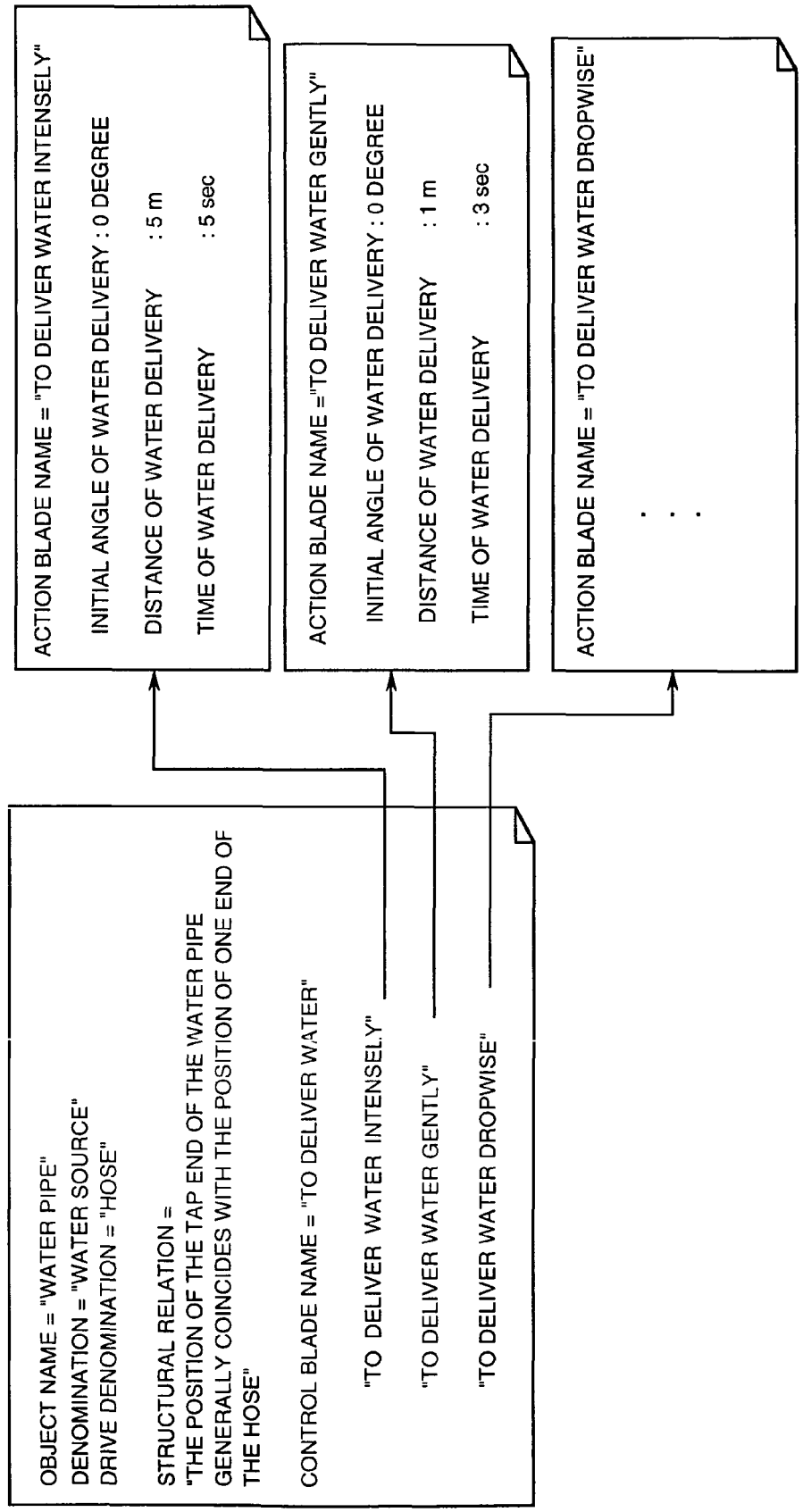
FIG. 23 is a diagram illustrating an example of data included in each blade according to the same embodiment.
Figure 24:
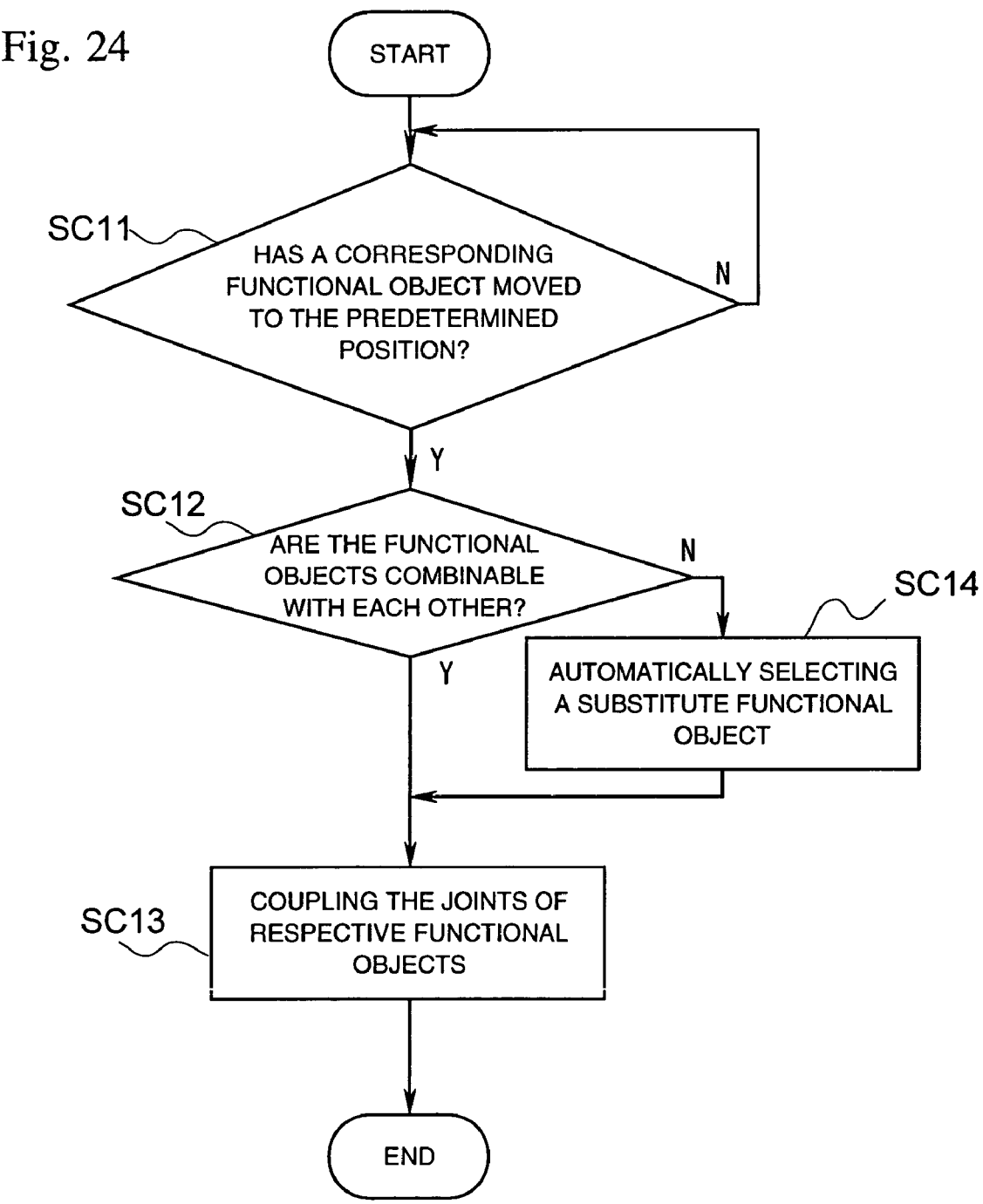
FIG. 24 is a flowchart of an operation of an object data receiving unit according to the same embodiment.
Figure 25:
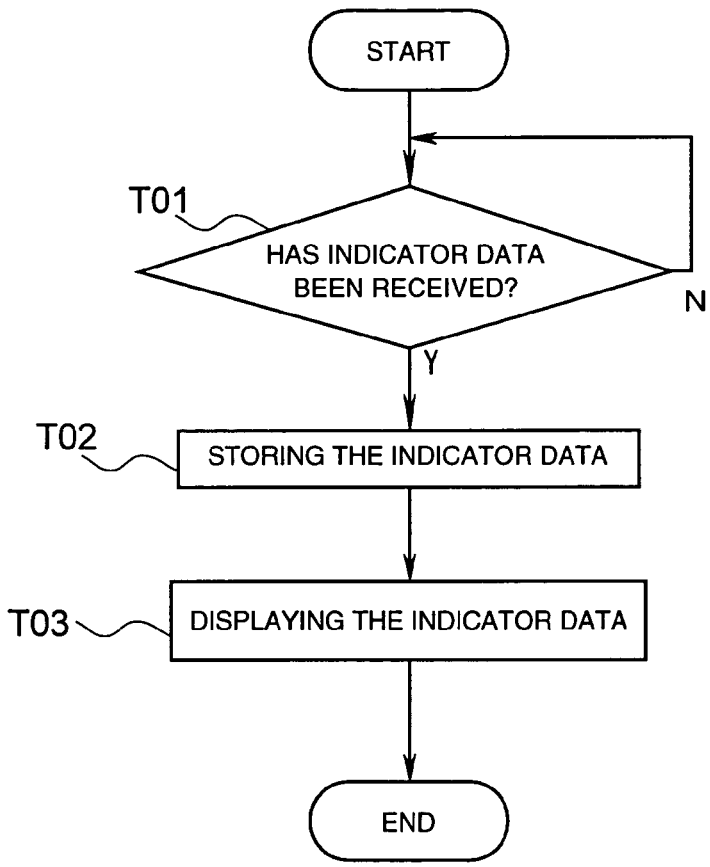
FIG. 25 is a flowchart of an operation of a managing unit according to the same embodiment.

Another embodiment is capable of imaging the condition of water delivery from a hose that is connectable to a water pipe. Specifically, assuming that the hose is connected to the water pipe in which tap water runs, in actuality the amount or force of water delivered from the distal end of the hose connected to the water pipe varies depending on the water pressure in the water pipe. In expressing this phenomenon in a virtual space, the relation between tap object TP and hose object HO should be described as structural relation data indicative of the coupling relation between these functional objects. Specifically, as shown in FIG. 23, two hierarchical levels are provided consisting of a control level forming the higher-level hierarchy and an action level forming the lower-level hierarchy. The control level should describe "OBJECT NAME", which is the name of a functional object, "denomination", which is a name identifier related to the role of the functional object, "drive denomination", which is a name identifier of an object as a subject of control, "STRUCTURAL RELATION", which determines the timing with which a structural relation occurs between "denomination" and "drive denomination", and "CONTROL BLADE NAME", which indicates how to control the object as the subject of control. In this embodiment there are described "water pipe" as the OBJECT NAME, "water source" as the denomination, "hose" object as the drive denomination, "the location of the tap end of the water pipe and the location of one end of the hose generally coincide with each other" as the STRUCTURAL RELATION, and "to deliver water" as the CONTROL BLADE NAME. The CONTROL BLADE NAME further describes three action blade indexes indicative of more specific actions of "to deliver water", namely "to deliver water intensely", "to deliver water gently" and "to deliver water dropwise".

The action level describes actions corresponding to the respective three action blade indexes "to deliver water intensely", "to deliver water gently" and "to deliver water dropwise", thereby making it possible to control specific actions caused by the structural relation. Though this embodiment describes these actions while specifying the initial angle, distance and time period of delivery of water from the other end of the hose object HO, the amount of water to be delivered and the like may be described. It is possible to use an environment variable as a parameter given as attached to a message comprising an instruction or the like from the outside.

By describing the function control data included in the tap object TP so that it is capable of indirectly controlling water object data on water delivered from the distal end of the hose object HO, it is possible to design, for example, a fountain, sprinkler and the like very easily.

Yet another embodiment is capable of imaging and expressing respective actions of one functional object and another functional object in a virtual space, the functional objects being configured to operate based on the attributive relation therebetween. For example, this embodiment is capable of assuming the process of a conversation, for example, among three persons in the virtual space, the first person being a Japanese capable of hearing and speaking Japanese only, the second one being an American capable of hearing and speaking English only, the third one being an interpreter capable of hearing and speaking Japanese and English both. Specifically, in assuming such a conversation in the virtual space, function control data included in a Japanese person object should be described so that when the Japanese person object speaks Japanese to an interpreter object, the interpreter object is caused to translate the Japanese speech of the Japanese person object into English, while function control data included in an American person object should be described so that when the American person object speaks English to the interpreter object, the interpreter object is caused to translate the English speech of the American person object into Japanese. With such a configuration wherein: a plurality of person objects capable of talking to each other in one or plural languages are provided; the function control data included in each person object is described so that the person objects operate based on the correlated roles of the respective person objects in the manner that the linguistic ability of one person object causes another person object to be driven as described above, it is possible to find an algorithm or the like, based on which conversation proceeds among persons speaking to each other in different mother tongues in the virtual space.

Such functional objects operating based on their correlated roles are applicable to articles such as a desk and a ball. Specifically, in imaging a ball rolling on a desk having an inclined surface, functional control data should be described at a desk object so that when a ball object is in contact with the inclined surface. of the desk object, the inclined surface causes the ball object to roll downwardly of the inclined surface. Function control data thus described is capable of causing any object to operate properly when the object is brought into contact with the inclined surface. Accordingly, movement of a pencil object rolling down on the inclined surface can be expressed when the pencil object is in contact with the inclined surface.

If plural object data items are provided with respective function control data items and functional objects have a predetermined relation represented by spatial relation data, structural relation data, attributive relation data, or a combination thereof, it is, of course, possible to image the functional objects controlling over each other and influencing each other.

In still yet another embodiment functional objects may represent personnel including employees and part-time workers stationed in a layout space of a factory, office, house or the like, or articles including industrial machines, office equipment, furniture and the like. For example, it is very easy to simulate an optimized office layout based on skills of respective staff members. If, for example, a supervisor object includes function control data described to control employee objects and part-time worker objects strictly, the working efficiency of a worker can be varied based on the positional relation between workers stationed or the like and the attributive relation between the workers as to their roles, whereby it is possible to image variations in the productivity of a more realistic office in the virtual space. Alternatively, if an appropriate functional object in an office includes function control data described, for example, to cause a predetermined staff member object to answer the telephone ringing, it is possible to have staff member objects do their respective business tasks according to their roles. By thus describing the roles of respective functional objects as function control data, an office layout offering higher productivity can be advantageously simulated and imaged. There is no particular limitation to imaging of various layouts under usual conditions. An embodiment applied to panic simulation simulating a disaster such as a fire or an earthquake, is conceivable.

While the foregoing embodiment is configured such that the automatic editor section 21a is operative to couple functional objects having a combinable relation therebetween to each other, an embodiment is possible such that when one functional object in a certain virtual space is selected, the one functional object having the name identifier of a subject of control transmits to all the other functional objects in the virtual space, while another functional object is driven by the name identifier of the subject of control to cause itself or the one functional object to be coupled to the counterpart based on control data described on the control blade or the like belonging to the aforesaid another functional object.

Another embodiment is possible such that the charging management section, which is included in the object data receiving unit P2 in the foregoing embodiment, is included in the object data transmitting unit P1 or the managing unit P3.

In accordance with the present invention having been described in detail, when one functional object is incorporated into another functional object having a predetermined name identifier, it is only required to define function control data that will work on the aforesaid another functional object at the aforesaid one functional object before combining the plural functional objects together so as to have a predetermined positional relation to each other in the virtual space. Once the plural functional objects are combined together, an object control section interprets the function control data of interest automatically and dynamically and causes the combination of the functional objects to exhibit functions essential to the combination.

Thus, even when evaluation needs to be made of selection or operation of a method of combining a number of functional resources or a layout prior to the introduction of equipment comprising plural functional resources into a factory for example, such evaluation can be made in the virtual space rapidly and easily without the need for enormous time and labor to develop simulation programs for respective combinations of functional resources as required by the prior art.

With only data structures and description standards for object data being rendered common to every one, even if different developers or corporations have developed their respective original functional objects, merely combining such functional objects displayed in the virtual space allows functions essential to the combination to be exhibited easily and dynamically. Thus, the present invention provides the effect of enabling new product development to be realized rapidly while making it possible to quickly and clearly find out products or services satisfying specifications that are recently becoming increasingly complicated and diversified according to requests from customers. Consequently, the present invention provides a novel possible way of advertising and marketing.

While only certain presently preferred embodiments of the present invention have been described in detail, as will be apparent for those skilled in the art, certain changes and modifications may be made in embodiments without departing from the spirit and scope of the present invention as defined by the following claims.

What is claimed is:

1. An object data receiving unit comprising:
   a functional object data storage section for storing functional object data corresponding to functional objects, the functional object data including imaging data for imaging each of the functional objects in a virtual space, a first name identifier allocated to a functional object, a second name identifier for indicating a compatible functional object capable of matching the functional object, and functional controlling data for producing a function of the compatible functional object when the functional object is matched to the compatible functional object indicated by the second name identifier; wherein the functional controlling data comprises data for causing movement or changes in form, color, or pattern, of the functional object in the virtual space;
   an object control section for imaging each functional object based on imaging data;
   an input receiving section for receiving a selective input of a plural of the functional objects comprising a first functional object and a second functional object; and
   an automatic editor section for determining if the first functional object selected can be matched to the second functional object selected by comparing the second name identifier included in the functional object data related to the first functional object with the first name identifier included in the functional object data related to the second functional object;
   wherein, when the first functional object can be matched to the second functional object, the object control section joins the first functional object to the second functional object based on the object data received for the first functional object, and then interprets functional control data on the first functional object to execute control, either directly or indirectly, of imaging data on the second functional object based on the interpretation.

2. The object data receiving unit in accordance with claim 1, further comprising a recording section for recording a history of operation having been performed on the unit to image functional resources as the functional objects in the virtual space and a phenomenon having occurred in the virtual space.

3. The object data receiving unit in accordance with claim 2, further comprising a recorded data transmitting section for externally transmitting data recorded by the recording section.

4. The object data receiving unit in accordance with claim 1, further comprising an indicator data calculating section for calculating an indicator allowing a user to operate the unit efficiently based on a history of operation having been performed on the unit to image functional resources as the functional objects in the virtual space and a phenomenon having occurred in the virtual space.

5. The object data receiving unit in accordance with claim 4, wherein the indicator is calculated based on data on utilization of the object data receiving unit including utilization frequencies within a fixed period and a total utilization time.

6. The object data receiving unit in accordance with claim 1, further comprising an automatic editor section for coupling a plurality of functional objects in the virtual space together by means of respective joints thereof when the plurality of functional objects have a predetermined relation therebetween.

7. An object data transmitting unit for use in a functional object imaging system, which is connected to an object data receiving unit as recited in claim 1 for communication, comprising:
   a specification data receiving section for receiving specification data comprising data on specifications of a required article, service or analog;
   an object data forming section for forming object data on all or part of plural functional objects based on the specification data, the plural functional objects being capable of exhibiting a function satisfying the specifications in a virtual space when combined together; and
   an object data transmitting section for transmitting the object data formed by the object data forming section.

8. The object data transmitting unit in accordance with claim 7, further comprising a unit control data storage section for storing unit control data items capable of being added, deleted and modified independently of imaging data, plural ones of which form function control data, wherein the object data forming section is operative to fetch the plural ones of the unit control data items from the unit control data storage section based on the specification data and combine the unit control data items together to form the function control data.

9. The object data transmitting unit in accordance with claim 7, wherein each of the unit control data items includes a name identifier of an applicable functional object, while the object data forming section is operative to fetch a unit control data item including a name identifier matching a name identifier of a functional object as a subject of control.

10. The object data transmitting unit in accordance with claim 7, wherein the functional object represents production equipment for producing a predetermined article to be produced or sold.

11. The object data transmitting unit in accordance with claim 7, wherein the functional object represents a predetermined article to be produced or sold.

12. The object data transmitting unit in accordance with claim 7, wherein the functional object represents personnel including part-time workers and employees stationed in a layout space of a factory, office or house, or an article including industrial machines, office equipment and furniture disposed in the layout space.

13. A managing unit for use in a functional object imaging system, which is connected to an object data receiving unit as recited in claim 1 for communication, comprising a recorded data receiving section for receiving data on utilization of functional objects at the object data receiving unit.

14. A functional object imaging system comprising an object data receiving unit as recited in claim 1, connected to an object data transmitting unit comprising:

a specification data receiving section for receiving specification data comprising data on specifications of a required article, service or analog;

an object data forming section for forming object data on all or part of plural functional objects based on the specification data, the plural functional objects being capable of exhibiting a function satisfying the specifications in a virtual space when combined together; and an object data transmitting section for transmitting the object data formed by the object data forming section, at least one of which is provided with a charging management section for conducting processing related to charging for utilization of functional objects.

* * * * *